United States Patent
Lee et al.

(10) Patent No.: US 12,143,194 B2
(45) Date of Patent: Nov. 12, 2024

(54) METHOD FOR SELECTING RECEPTION BEAM IN ELECTRONIC DEVICE, AND ELECTRONIC DEVICE

(71) Applicant: SAMSUNG ELECTRONICS CO., LTD., Suwon-si (KR)

(72) Inventors: Hyoungjoo Lee, Suwon-si (KR); Sanggeun Lee, Suwon-si (KR); Juhyun Lee, Suwon-si (KR); Euichang Jung, Suwon-si (KR); Chaiman Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 17/568,233

(22) Filed: Jan. 4, 2022

(65) Prior Publication Data
US 2022/0123824 A1 Apr. 21, 2022

Related U.S. Application Data

(63) Continuation of application No. PCT/KR2021/012977, filed on Sep. 23, 2021.

(30) Foreign Application Priority Data

Sep. 28, 2020 (KR) .................. 10-2020-0126152

(51) Int. Cl.
*H04B 7/08* (2006.01)
*H04B 17/309* (2015.01)

(52) U.S. Cl.
CPC .......... *H04B 7/0857* (2013.01); *H04B 7/088* (2013.01); *H04B 17/309* (2015.01)

(58) Field of Classification Search
CPC .... H04B 7/0857; H04B 7/088; H04B 17/309; H04B 7/0874; H04B 17/318; H04J 11/00;
(Continued)

(56) References Cited

U.S. PATENT DOCUMENTS

2015/0289219 A1 10/2015 Kim et al.
2015/0295596 A1 10/2015 Wloczysiak et al.
(Continued)

FOREIGN PATENT DOCUMENTS

CA 2789380 A1 * 8/2011 .......... H04L 1/0026
JP 2019-205204 11/2019
(Continued)

OTHER PUBLICATIONS

Machine translation of CN-107707286-B. (Year: 2023).*
(Continued)

*Primary Examiner* — Jean B Corrielus
(74) *Attorney, Agent, or Firm* — Nixon & Vanderhye, P.C.

(57) ABSTRACT

According to various embodiments, an electronic device may include: at least one antenna module including at least one antenna, and a processor configured to: control the electronic device to receive, through the at least one antenna module, a reference signal (RS) corresponding to each of frequency bands of multiple component carriers (CC) configured for carrier aggregation (CA), identify a reception signal strength of the reference signal corresponding to each of the frequency bands with regard to the multiple CCs, identify at least two CCs operating in the CA among the multiple CCs, based on reception signal strengths of multiple reference signals corresponding to the multiple CCs, and determine at least one reception beam corresponding to the at least one antenna module based on reception signal strengths of at least two reference signals corresponding to the at least two identified CCs.

20 Claims, 16 Drawing Sheets

(58) Field of Classification Search
CPC ........ H04J 11/0069; H04L 5/00; H04L 5/001; H04W 48/10
See application file for complete search history.

(56) References Cited

U.S. PATENT DOCUMENTS

| | | |
|---|---|---|
| 2015/0305035 A1 | 10/2015 | Hu et al. |
| 2015/0327218 A1 | 11/2015 | Kim |
| 2018/0007642 A1 | 1/2018 | Feuersaenger et al. |
| 2018/0062707 A1 | 3/2018 | Chen et al. |
| 2019/0045551 A1 | 2/2019 | Wu et al. |
| 2019/0182898 A1 | 6/2019 | Yu et al. |
| 2019/0245606 A1 | 8/2019 | Ha et al. |
| 2019/0393989 A1 | 12/2019 | Jung et al. |
| 2020/0028561 A1 | 1/2020 | Leulescu et al. |
| 2020/0045684 A1 | 2/2020 | Futaki |
| 2020/0235871 A1 | 7/2020 | Kim et al. |
| 2020/0287606 A1 | 9/2020 | Lee et al. |
| 2021/0360665 A1* | 11/2021 | Takahashi ............ H04L 5/0092 |
| 2022/0116855 A1 | 4/2022 | Amuru et al. |

FOREIGN PATENT DOCUMENTS

| | | |
|---|---|---|
| KR | 10-2015-0087842 | 7/2015 |
| KR | 10-2016-0077951 | 7/2016 |
| KR | 10-1749538 | 6/2017 |
| KR | 10-2019-0022181 | 3/2019 |
| KR | 10-2019-0028346 | 3/2019 |
| KR | 10-2019-0096226 | 8/2019 |
| KR | 10-2019-0106463 | 9/2019 |
| KR | 10-2019-0143733 | 12/2019 |
| KR | 10-2020-0034508 | 3/2020 |
| KR | 10-2020-0050309 | 5/2020 |
| WO | 2012/158976 | 11/2012 |
| WO | 2019/050370 | 3/2019 |

OTHER PUBLICATIONS

International Search Report and Written Opinion dated Jan. 3, 2022 in corresponding International Application No. PCT/KR2021/012977.

* cited by examiner

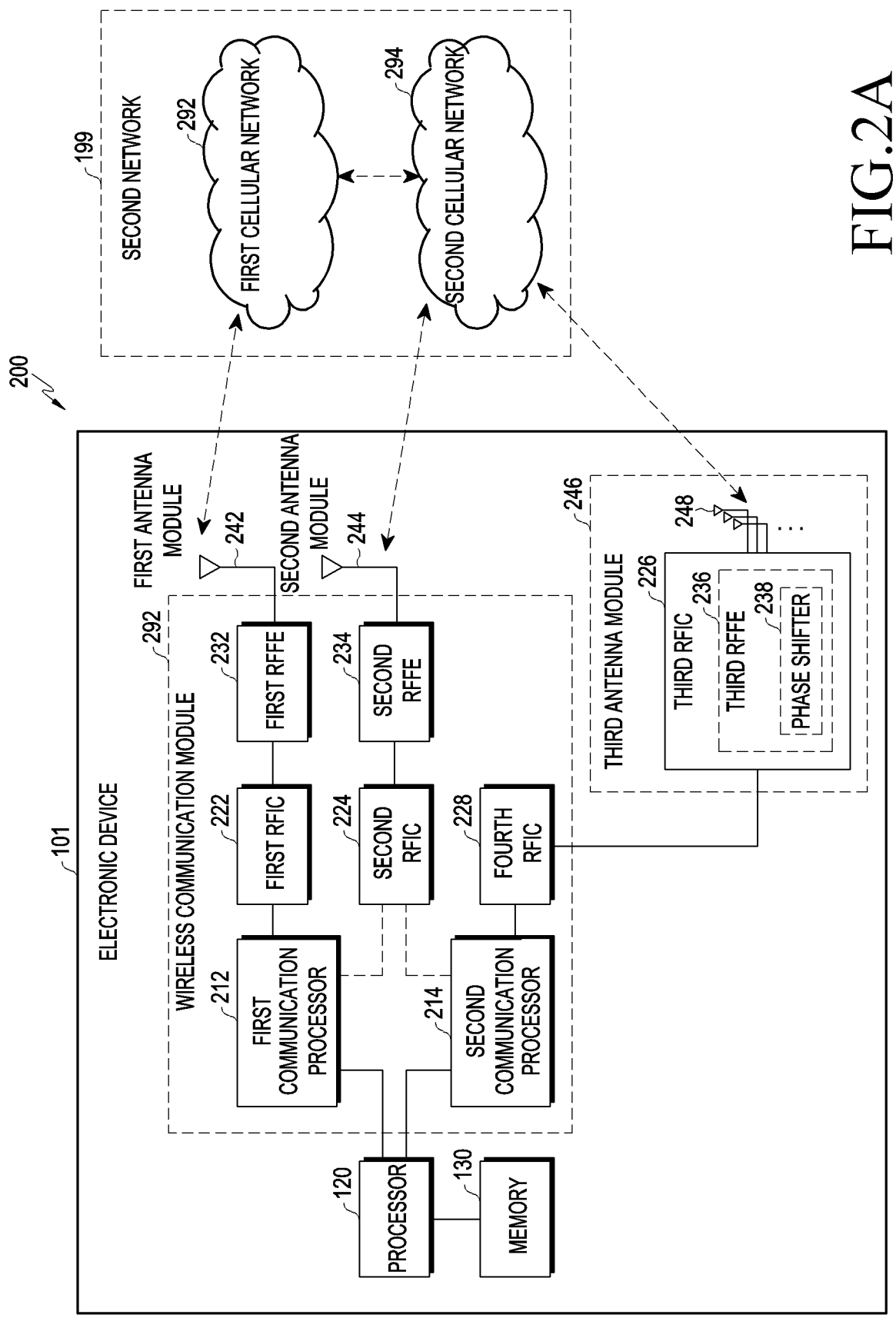

METHOD FOR SELECTING RECEPTION BEAM IN ELECTRONIC DEVICE, AND ELECTRONIC DEVICE

CROSS-REFERENCE TO RELATED APPLICATIONS

This application is continuation of International Application No. PCT/KR2021/012977, filed on Sep. 23, 2021, which claims priority to Korean Patent Application No. 10-2020-0126152, filed on Sep. 28, 2020, in the Korean Intellectual Property Office, the disclosures of which are incorporated by reference herein in their entireties.

BACKGROUND

Field

The disclosure relates to a method for selecting a reception beam in an electronic device that supports beamforming, and an electronic device.

Description of Related Art

In order to meet the increase in the demand for wireless data traffic after the commercialization of 4th generation (4G) communication systems, considerable effort has been made to develop improved 5th generation (5G) communication systems or pre-5G communication systems. For this reason, 5G communication systems or pre-5G communication systems may be referred to as beyond 4G network communication systems or post LTE systems.

In order to achieve a high data transmission rate, 5G communication systems are being developed to be implemented in a higher frequency band (for example, a band of 60 GHz or a mmWave band). In order to reduce the path loss of electric waves in the mmWave band and to increase the transmission distance of electric waves, technologies of beamforming, massive multiple-input and multiple-output (massive MIMO), full dimensional MIMO (FD-MIMO), array antenna, analog beam-forming, or large scale antenna are being discussed in 5G communication systems.

For example, when signals are transmitted/received in a mmWave frequency (for example, above 6 GHz, FR2) band in connection with a 5G wireless communication system, a multiantenna-based beamforming technology may be used to overcome high levels of signal attenuation. The beamforming refers to a method for maximizing the signal transmission/reception gain in the direction to be aimed at, by adjusting the phase with regard to each antenna.

A 5G wireless communication system operating wide frequency bands may use carrier aggregation (CA) so as to transmit data through multiple component carriers (CC), thereby providing high data rates.

In connection with multiple CCs operating in the CA type, a base station may form a different transmission beam for each CC and may transmit the same to an electronic device. In order to form a different reception beam for each CC with regard to the multiple CCs, the electronic device may need antenna modules (for example, mmWave modules) therein as many as the multiple CCs. If hardware restrictions make it difficult to mount antenna modules in the electronic device as many as the CCs, the electronic device may have difficulty in generating a different reception beam for each CC when operating in the CA type.

SUMMARY

Embodiments of the disclosure may provide a method for selecting a reception beam in an electronic device, and an electronic device, wherein a reception beam regarding multiple CCs can be effectively selected in an electronic device having antenna modules, the number of which is smaller than that of CCs.

According to various example embodiments, an electronic device may include: at least one antenna module including at least one antenna, and a processor configured to: control the electronic device to receive, through the at least one antenna module, a reference signal (RS) corresponding to each of frequency bands of multiple component carriers (CC) configured for carrier aggregation (CA), identify a reception signal strength of the RS corresponding to each of the frequency bands of the multiple CCs, identify at least two CCs operating in the CA from among the multiple CCs based on reception signal strengths of multiple RSs corresponding to the multiple CCs, and identify at least one reception beam corresponding to the at least one antenna module based on the reception signal strengths of at least two RSs corresponding to the at least two identified CCs.

According to various example embodiments, an electronic device may include: at least one antenna module including at least one antenna, and a processor configured to: control the electronic device to receive, through the at least one antenna module, a reference signal (RS) corresponding to each of frequency bands of multiple component carriers (CC) configured for carrier aggregation (CA), identify a reception signal strength of the RS corresponding to each of the frequency bands of the multiple CCs, group at least two CCs from among the multiple CCs based on the identified reception signal strengths of multiple reference signals corresponding to the respective frequency bands of the multiple CCs, and identify a reception beam corresponding to the at least one antenna module based on reception signal strengths of at least two RSs corresponding to the at least two grouped CCs.

According to various example embodiments, a method for selecting a reception beam in an electronic device may include: receiving, through the at least one antenna module, a reference signal (RS) corresponding to each of frequency bands of multiple component carriers (CC) configured for carrier aggregation (CA), identifying a reception signal strength of the RS corresponding to each of the frequency bands of the multiple CCs, grouping at least two CCs among the multiple CCs based on identified reception signal strengths of multiple RSs corresponding to the respective frequency bands of the multiple CCs, and identifying a reception beam corresponding to the at least one antenna module, based on reception signal strengths of at least two RSs corresponding to the at least two grouped CCs.

According to various example embodiments, when a 5G mmWave network supports CA, an electronic device having antenna modules, the number of which is smaller than that of CCs, may select an optimal reception beam according to various criteria depending on the situation.

According to various example embodiments, when a 5G mmWave network supports CA, multiple CCS having a high degree of correlation may be grouped to determine a reception beam, and it is thus possible to compare the results of measuring signals in similar directions multiple times during a single SSB transmission period, thereby reducing the time needed by the electronic device to select the reception beam.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2A is a block diagram illustrating an example configuration of an electronic device for supporting legacy network communication and 5G network communication according to various embodiments;

DETAILED DESCRIPTION

Figure 1:
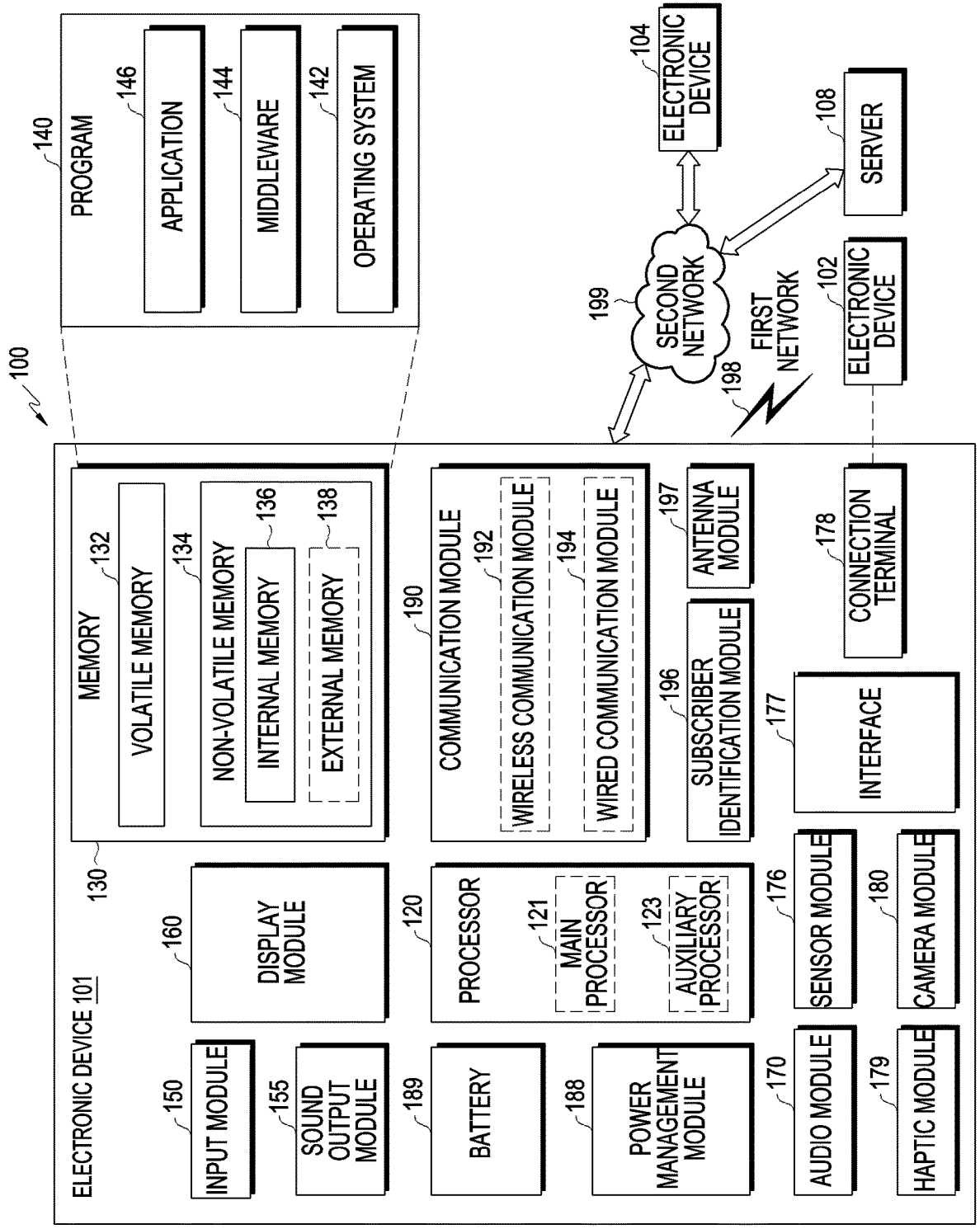
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and a memory 130. The second network 199 may include a first cellular network 292 and a second cellular network 294. According to an embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to an embodiment, the fourth RFIC 228 may be omitted or may be included as a part of the third RFIC 226.

The first communication processor 212 may include various processing circuitry and establish a communication channel of a band to be used for wireless communication with the first cellular network 292, and may support legacy network communication through the established communication channel. According to various embodiments, the first cellular network may be a legacy network including a second generation (2G), 3G, 4G, or long-term evolution (LTE) network. The second communication processor 214 may establish a communication channel corresponding to a designated band (e.g., approximately 6 GHz to 60 GHZ) among bands to be used for wireless communication with the second cellular network 294, and may support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., approximately 6 GHz or less) among bands to be used for wireless communication with the second cellular network 294, and may support 5G network communication through the established communication channel.

The first communication processor 212 may transmit or receive data to or from the second communication processor 214. For example, data classified to be transmitted through the second cellular network 294 may be changed to be transmitted through the first cellular network 292. Here, the first communication processor 212 may receive transmission data from the second communication processor 214. For example, the first communication processor 212 may transmit or receive data to or from the second communication processor 214 via an interprocessor interface (not shown). The interprocessor interface may be implemented as, for example, a universal asynchronous receiver/transmitter (UART) (e.g., a high speed-UART (HS-UART) or peripheral component interconnect bus express (PCIe) interface), and there is no limitation on the types thereof. Alternatively, the first communication processor 212 and the second communication processor 214 may exchange control information and packet data information using, for example, a shared memory. The communication processor 212 may perform, to or from the second communication processor 214, transmission or reception of various information such as sensing information, output strength information, and resource block (RB) allocation information.

According to the implementation, the first communication processor 212 may not be directly connected to the second communication processor 214. Here, the first communication processor 212 may transmit or receive data to or from the second communication processor 214 through the processor 120 (e.g., an application processor). For example, the first communication processor 212 may transmit or receive data to or from the second communication processor 214 through the processor 120 (e.g., an application processor), a HS-UART interface, or a PCIe interface, but there is no restriction on the type of interfaces. Alternatively, the first communication processor 212 and the second communication processor 214 may exchange control information and packet data information via the processor 120 (e.g., an application processor) using a shared memory.

Figure 2B:
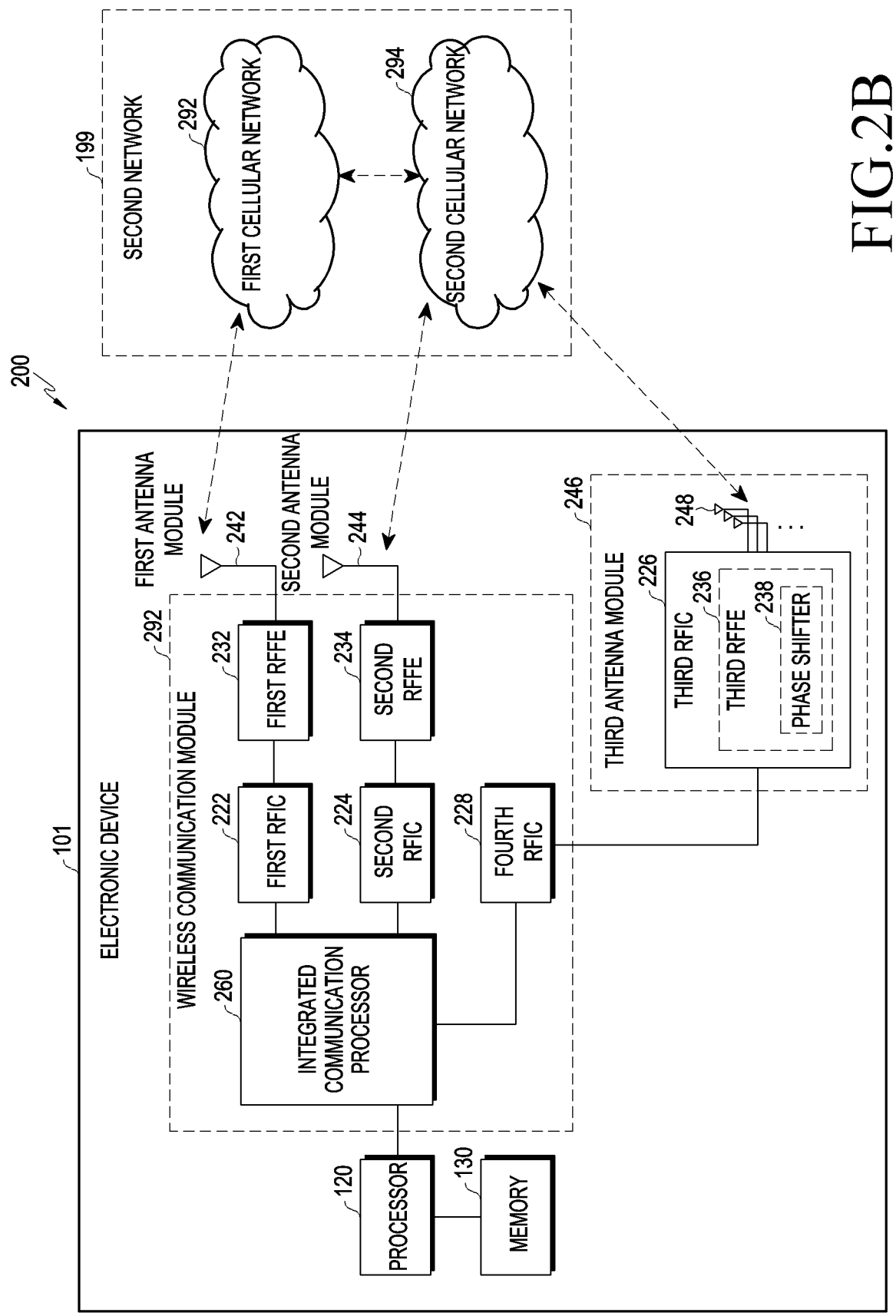
FIG. 2B is a block diagram illustrating an example configuration of an electronic device for supporting legacy network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be formed in a single chip or a single package, together with the processor 120, the auxiliary processor 123, or the communication module 190. For example, as shown in FIG. 2B, the integrated communication processor 260 may support both a function for communicating with the first cellular network 292 and a function for communicating with the second cellular network 294.

In a case of transmission, the first RFIC 222 may convert a baseband signal generated by the first communication processor 212 into a radio frequency (RF) signal in the range of approximately 700 MHz to 3 GHz used for the first cellular network 292 (e.g., a legacy network). In a case of reception, an RF signal is obtained from a first network 292 (e.g., a legacy network) via an antenna (e.g., a first antenna module 242), and may be preprocessed via an RFFE (e.g., a first RFFE 232). The first RFIC 222 may convert the preprocessed RF signal into a baseband signal so that the base band signal is processed by the first communication processor 212.

In a case of transmission, the second RFIC 224 may convert a baseband signal generated by the first communication processor 212 or the second communication processor 214 into an RF signal (hereinafter, referred to as 5G Sub6 RF signal) of an Sub6 band (e.g., approximately 6 GHz or less) used for the second cellular network 294 (e.g., a 5G network). In a case of reception, a 5G Sub6 RF signal is obtained from the second cellular network 294 (e.g., 5G network) via an antenna (e.g., the second antenna module 244), and may be preprocessed via an RFFE (e.g., the second RFFE 234)). The second RFIC 224 may convert the preprocessed 5G Sub6 RF signal into a baseband signal so that the baseband signal is processed by a corresponding communication processor from among the first communication processor 212 and the second communication processor 214.

The third RFIC 226 may convert a baseband signal generated by the second communication processor 214 to an RF signal (hereinafter, referred to as 5G Above6 RF signal) of a 5G Above6 band (e.g., approximately 6 GHz to 60 GHz) to be used for the second cellular network 294 (e.g., 5G network). In a case of reception, a 5G Above6 RF signal is obtained from the second cellular network 294 (e.g., 5G network) via an antenna (e.g., the antenna 248), and may be preprocessed via a third RFFE 236. The third RFIC 226 may convert the preprocessed 5G Above6 RF signal into a baseband signal so that the baseband signal is processed by the second communication processor 214. According to an embodiment, the third RFFE 236 may be formed as part of the third RFIC 226.

According to an embodiment, the electronic device 101 may include the fourth RFIC 228 separately from or as at least a part of the third RFIC 226. Here, the fourth RFIC 228 converts the baseband signal generated by the second communication processor 214 into an RF signal (hereinafter, IF signal) of an intermediate frequency band (e.g., approximately 9 GHz to 11 GHZ), and may transfer the IF signal to the third RFIC 226. The third RFIC 226 may convert the IF signal into a 5G Above6 RF signal. In a case of reception, a 5G Above6 RF signal may be received from the second cellular network 294 (e.g., 5G network) via an antenna (e.g., the antenna 248), and may be converted into an IF signal by the third RFIC 226. The fourth RFIC 228 may convert the IF signal into a baseband signal so that the baseband signal is processed by the second communication processor 214.

According to an embodiment, the first RFIC 222 and the second RFIC 224 may be implemented as a single chip or at least a part of the single package. According to various embodiments, if the first RFIC 222 and the second RFIC 224 are implemented as a single chip or a single package in FIG. 2A or FIG. 2B, the first and the second RFIC may be implemented as an integrated RFIC. Here, the integrated RFIC is connected to the first RFFE 232 and the second RFFE 234 and thus converts a baseband signal into a signal of a band supported by the first RFFE 232 and/or the second RFFE 234, and may transmit the converted signal to one of the first RFFE 232 and the second RFFE 234. According to an embodiment, at least one antenna module among the first antenna module 242 and the second antenna module 244 may be omitted, or may be combined with another antenna module so as to process RF signals in multiple corresponding bands.

According to an embodiment, the third RFIC 226 and the antenna 248 may be disposed on the same substrate to form the third antenna module 246. For example, the wireless communication module 192 or the processor 120 may be disposed on a first substrate (e.g., main PCB). Here, the third antenna module 246 may be formed such that the third RFIC 226 is disposed on a part (e.g., a lower part) of the second substrate (e.g., sub-PCB) separate from the first substrate, and the antenna 248 is disposed on another part (e.g., an upper part). By disposing the third RFIC 226 and the antenna 248 on the same substrate, the length of a transmission line therebetween can be reduced. For example, this may reduce a loss (e.g., attenuation) of a signal in a high-frequency band (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be formed as an antenna array including multiple antenna elements that may be used for beamforming. Here, the third RFIC 226 may be, for example, a part of the third RFFE 236, and may include multiple phase shifters 238 corresponding to multiple antenna elements. In a case of transmission, each of the multiple phase shifters 238 may shift the phase of a 5G Above6 RF signal to be transmitted to the outside of the electronic device 101 (e.g., a base station of a 5G network) through a corresponding antenna element. In a case of reception, each of the multiple phase shifters 238 may shift the phase of a 5G Above6 RF signal received from the outside through a corresponding antenna element into the same or substantially the same phase. This may enable transmission or reception via beamforming between the electronic device 101 and the outside.

The second cellular network 294 (e.g., 5G network) may operate independently (e.g., stand-alone (SA)) from the first cellular network 292 (e.g., a legacy network), or may operate by being connected thereto (e.g., non-stand-alone (NSA)). For example, in the 5G network, only an access network (e.g., 5G radio access network (RAN) or next generation RAN (NG RAN)) may exist, and a core network (e.g., next generation core (NGC)) may not exist. Here, the electronic device 101 may access an access network of the 5G network, and then may access an external network (e.g., the Internet) under the control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by other components (e.g., the processor 120, the first communication processor 212, or the second communication processor 214).

Figure 3:
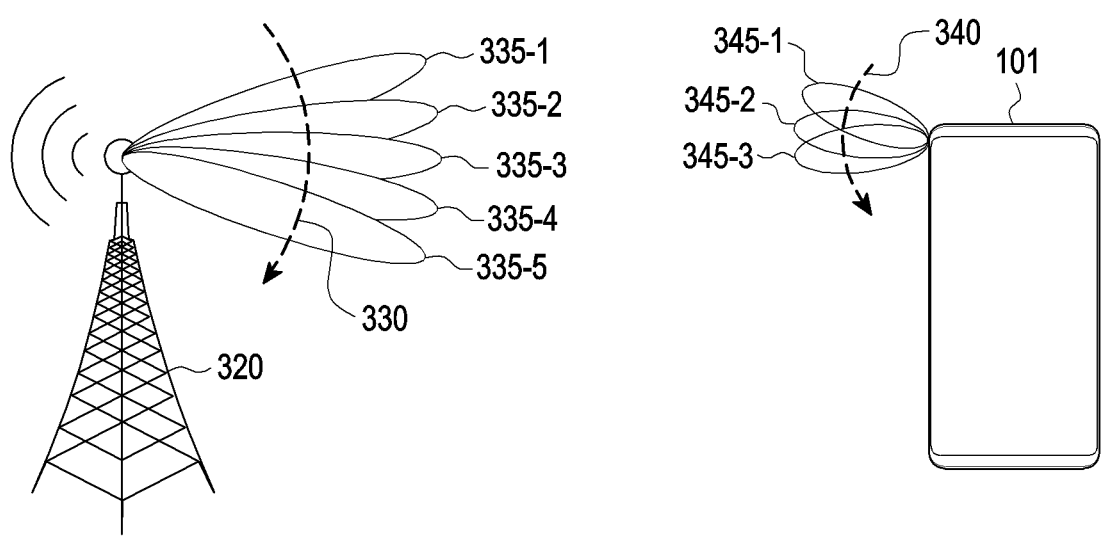
FIG. 3 is a diagram illustrating an example operation for wireless communication connection between a base station and an electronic device according to various embodiments.

FIG. 3 is a diagram illustrating an example operation for wireless communication connection between a base station 320 and an electronic device 101, in a second network 294 (e.g., 5G network) of FIG. 2A or FIG. 2B, which uses a directional beam for wireless connection according to various embodiments. The base station 320 (e.g., gNodeB (gNB), transmission reception point (TRP)) may perform a beam detection operation with the electronic device 101 for the wireless communication connection. In the illustrated embodiment, for the beam detection, the base station 320 may sequentially transmit multiple transmission beams, for example, first to fifth transmission beams 335-1, 335-2, 335-3, 335-4 and 335-5 (which may be referred to hereinafter as beams 335-1 to 335-5) having different directions, and thus may perform at least one transmission beam sweeping 330.

The first to fifth transmission beams 335-1 to 335-5 may include at least one synchronization signal block (SSB) (for example, synchronization sequences (SS)/physical broadcast channel (PBCH) block). The SS/PBCH block may be used to periodically measure the channel or beam intensity of the electronic device 101.

In an embodiment, the first to fifth transmission beams 335-1 to 335-5 may include at least one channel state information-reference signal (CSI-RS). The CSI-RS is a standard/reference signal that can be configured flexibly by the base station 320, and may be transmitted periodically/semi-persistently, or aperiodically. The electronic device 101 may measure the channel or beam intensity using the CSI-RS.

The transmission beams may form a radiation pattern having a selected beam width. For example, the transmission beams may have a broad radiation pattern having a first beam width or a sharp radiation pattern having a second beam width that is narrower than the first beam width. For example, the transmission beams including the SS/PBCH block may have a wider radiation pattern than the transmission beams including the CSI-RS.

The electronic device 101 may perform reception beam sweeping 340 while the base station 320 performs transmission beam sweeping 330. For example, the electronic device 101 may receive the signal of the SS/PBCH block transmitted via at least one of the first to fifth transmission beams 335-1 to 335-5 by fixing the first reception beam 345-1 in a first direction, while the base station 320 performs the first transmission beam sweeping 330. The electronic device 101 may receive the signal of the SS/PBCH block transmitted via the first to fifth transmission beams 335-1 to 335-5 by fixing the second reception beam 345-2 in a second direction, while the base station 320 performs the second transmission beam sweeping 330. As such, the electronic device 101 may select a reception beam having the best signal quality or communicable reception beam (e.g., the second reception beam 345-2) and a transmission beam having the best signal quality or communicable transmission beam (e.g., the third transmission beam 335-3), based on a result of the signal reception operation through the reception beam sweeping 340. The selected reception beam (e.g., the second reception beam 345-2) and the transmission beam (e.g., the third transmission beam 335-3) may be referred to as a beam pair.

As described above, after the transmission and reception beams are determined, the base station 320 and the electronic device 101 may transmit and/or receive basic information for cell configuration, and may configure information for additional beam operation, based on the information. For example, the beam operation information may include detailed information of the configured beam, or configuration information of the SS/PBCH block, CSI-RS, or an additional reference signal.

In addition, the electronic device 101 may continuously monitor the channel and the beam intensity using at least one of the SS/PBCH block and the CSI-RS included in the transmission beam. The electronic device 101 may adaptively select a beam having a good beam quality using the monitoring operation. Optionally, if the communication connection is released due to the movement of the electronic device 101 or the blockage of the beam, the above-described beam sweeping may be performed again to determine a communicable beam.

Figure 4:
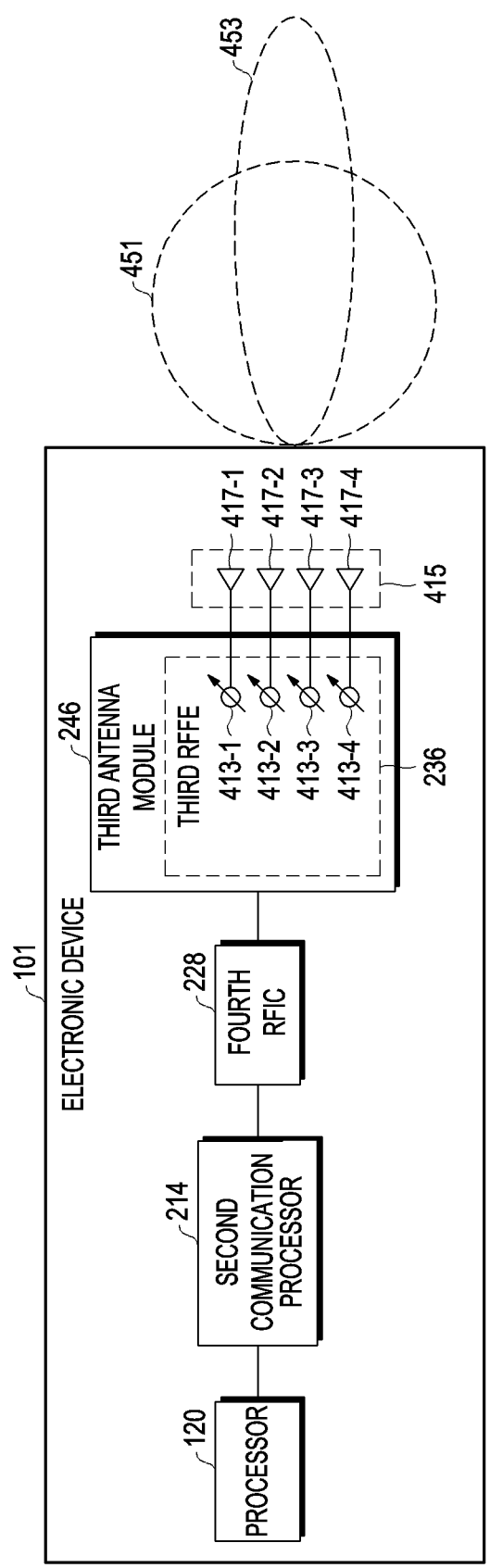
FIG. 4 is a block diagram illustrating an example configuration of an electronic device configured to perform beamforming according to various embodiments.

FIG. 4 is a block diagram illustrating an example configuration of an electronic device 101 for 5G network communication according to various embodiments. Although the electronic device 101 may include various components shown in FIG. 2A or FIG. 2B, the electronic device 101 is illustrated to include a processor 120, a second communication processor 214, a fourth RFIC 228, and at least one third antenna module 246, for convenience of description, in FIG. 4.

In the illustrated embodiment, the third antenna module 246 may include first to fourth phase shifters 413-1, 413-2, 413-3 and 413-4 which may be referred to hereinafter as phase shifters 413-1 to 413-4 (e.g., a phase shifter 238 of FIG. 2A or FIG. 2B) and/or first to fourth antenna elements 417-1, 417-2, 417-3 and 417-4 which may be referred to hereinafter as antenna elements 417-1 to 417-4 (e.g., an antenna 248 of FIG. 2A or FIG. 2B). Each one of the first to fourth antenna elements 417-1 to 417-4 may be electrically connected to an individual one of the first to fourth phase shifters 413-1 to 413-4. The first to fourth antenna elements 417-1 to 417-4 may form at least one antenna array 415.

The second communication processor 214 may control phases of signals transmitted and/or received through the first to fourth antenna elements 417-1 to 417-4 by controlling the first to fourth phase shifters 413-1 to 413-4, thereby generating a transmission beam and/or a reception beam in a selected direction.

According to an embodiment, the third antenna module 246 may form a broad radiation pattern beam 451 (hereinafter, referred to as "a wide beam") or a narrow radiation pattern beam 452 (hereinafter, referred to as "a narrow beam") mentioned above, depending on the number of the used antenna elements. For example, the third antennal module 246 may form the narrow beam 452 if all of the first to fourth antennal elements 417-1 to 417-4 are used, and may form the wide beam 451 if only the first antenna element 417-1 and the second antenna element 417-2 are used. The wide beam 451 has wider coverage than that of the narrow beam 452 but has a smaller antenna gain than that of the narrow beam 452, and thus may be more effective at the time of beam searching. On the other hand, the narrow beam 452 has narrower coverage than that of the wide beam 451 but has a higher antenna gain than that of the wide beam 451, thereby improving communication performance.

According to an embodiment, the second communication processor 214 may utilize a sensor module 176 (e.g., a 9-axis sensor, a grip sensor, or a global positioning system (GPS)) for beam searching. For example, the electronic device 101 may adjust the searching location of the beam and/or the beam searching period, based on the location and/or movement of the electronic device 101, using the sensor module 176. As another example, if the electronic device 101 is gripped by the user, a grip sensor may be used to grasp the gripped part by the user, thereby selecting an antenna module having better communication performance among the multiple third antenna modules 246.

Figure 5A:
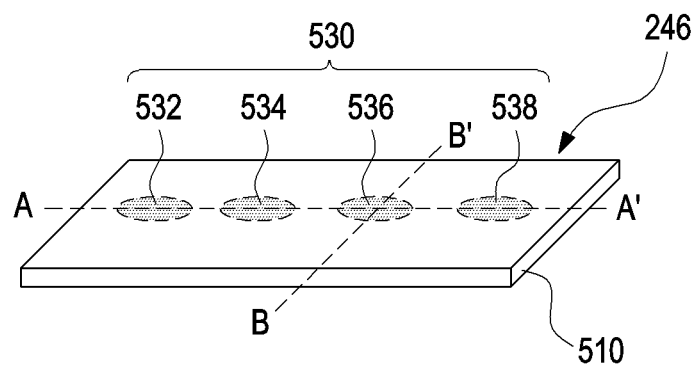
FIGS. 5A, 5B, and 5C are diagrams illustrating an example structure of an antenna module according to various embodiments.
Figure 5B:
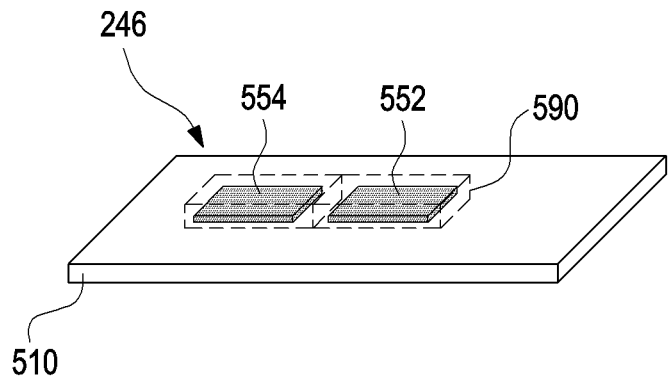
Figure 5C:
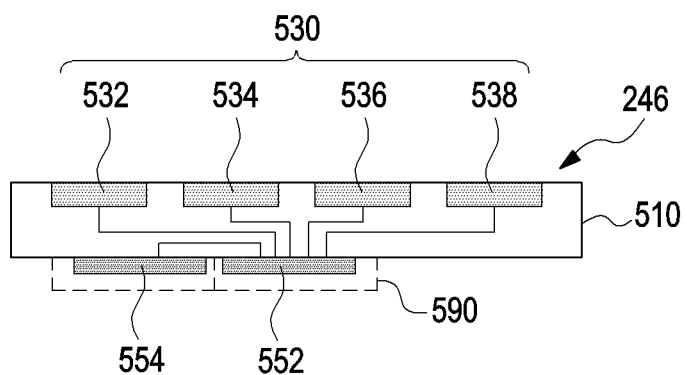

FIGS. 5A, 5B, and 5C are diagrams illustrating an example structure of the third antenna module 246 described with reference to FIG. 2, for example, according to various embodiments. FIG. 5A is a perspective view of the third antenna module 246 when viewed from one side, and FIG. 5B is a perspective view of the third antenna module 246 when viewed from another side. FIG. 5C is a cross-sectional view of the third antenna module 246 taken along line A-A'.

Referring to FIGS. 5A, 5B, and 5C, in an embodiment, the third antenna module 246 may include a printed circuit board 510, an antenna array 530, a radio frequency integrated circuit (RFIC) 552, and a power manage integrated circuit (PMIC) 554. Optionally, the third antenna module 246 may further include a shielding member 590. In other embodiments, at least one of the above components may be omitted, or at least two of the above components may be integrally formed.

The printed circuit board 510 may include multiple conductive layers and multiple non-conductive layers, and the conductive layers and the non-conductive layers may be alternately stacked. The printed circuit board 510 may provide an electrical connection between various electronic components, which are disposed on the printed circuit board 510 and/or on the outside, using wires and conductive vias formed in the conductive layers.

The antenna array 530 (e.g., the antenna 248 of FIG. 2) may include multiple antenna elements 532, 534, 536, and 538 disposed to form a directional beam. The antenna elements may be formed on a first surface of the printed circuit board 510 as illustrated. According to an embodiment, the antenna array 530 may be formed inside the printed circuit board 510. According to various embodiments, the antenna array 530 may include multiple antenna arrays having the same shape/type or different shapes types (e.g., a dipole antenna array and/or a patch antenna array).

The RFIC 552 (e.g., 226 of FIG. 2) may be disposed in another region (e.g., a second surface opposite to the first surface) of the printed circuit board 510 to be spaced apart from the antenna array. The RFIC 552 may be configured to process a signal of a selected frequency band transmitted/received through the antenna array 530. According to an embodiment, in a case of transmission, the RFIC 552 may convert a baseband signal obtained from a communication processor (e.g., the second communication processor 214) into an RF signal of a designated band. In a case of reception, the RFIC 552 may convert an RF signal received through the antenna array 530 into a baseband signal and may transfer the baseband signal to a communication processor.

According to an embodiment, in a case of transmission, the RFIC 552 may up-convert an IF signal (e.g., approximately 9 GHz to approximately 11 GHz) obtained from an intermediate frequency integrated circuit (IFIC) (e.g., the fourth RFIC 228 of FIG. 2A or FIG. 2B) into an RF signal in a selected band. In a case of reception, the RFIC 552 may down-convert an RF signal obtained through the antenna array 530 and covert the down-converted RF signal into an IF signal, and thus may transfer the IF signal to the IFIC (e.g., the fourth RFIC 228 of FIG. 2A or FIG. 2B).

The PMIC 554 may be disposed in another partial region (e.g., on the second surface) of the printed circuit board 510, which is spaced apart from the antenna array. The PMIC may be supplied with a voltage from a main PCB (not illustrated) and may provide a power necessary for various components (e.g., the RFIC 552) on the antenna module.

The shielding member 590 may be disposed on a part (e.g., on the second surface) of the printed circuit board 510 such that at least one of the RFIC 552 and the PMIC 554 is electromagnetically shielded. According to an embodiment, the shielding member 590 may include a shield in the form of a shield can.

Although not illustrated, in various embodiments, the third antenna module 246 may be electrically connected to another printed circuit board (e.g., a main PCB) through a module interface. The module interface may include a connection member, for example, a coaxial cable connector, a board to board connector, an interposer, or a flexible printed circuit board (FPCB). The RFIC 552 and/or the PMIC 554 of the antenna module may be electrically connected to the printed circuit board through the connection member.

Figure 6:
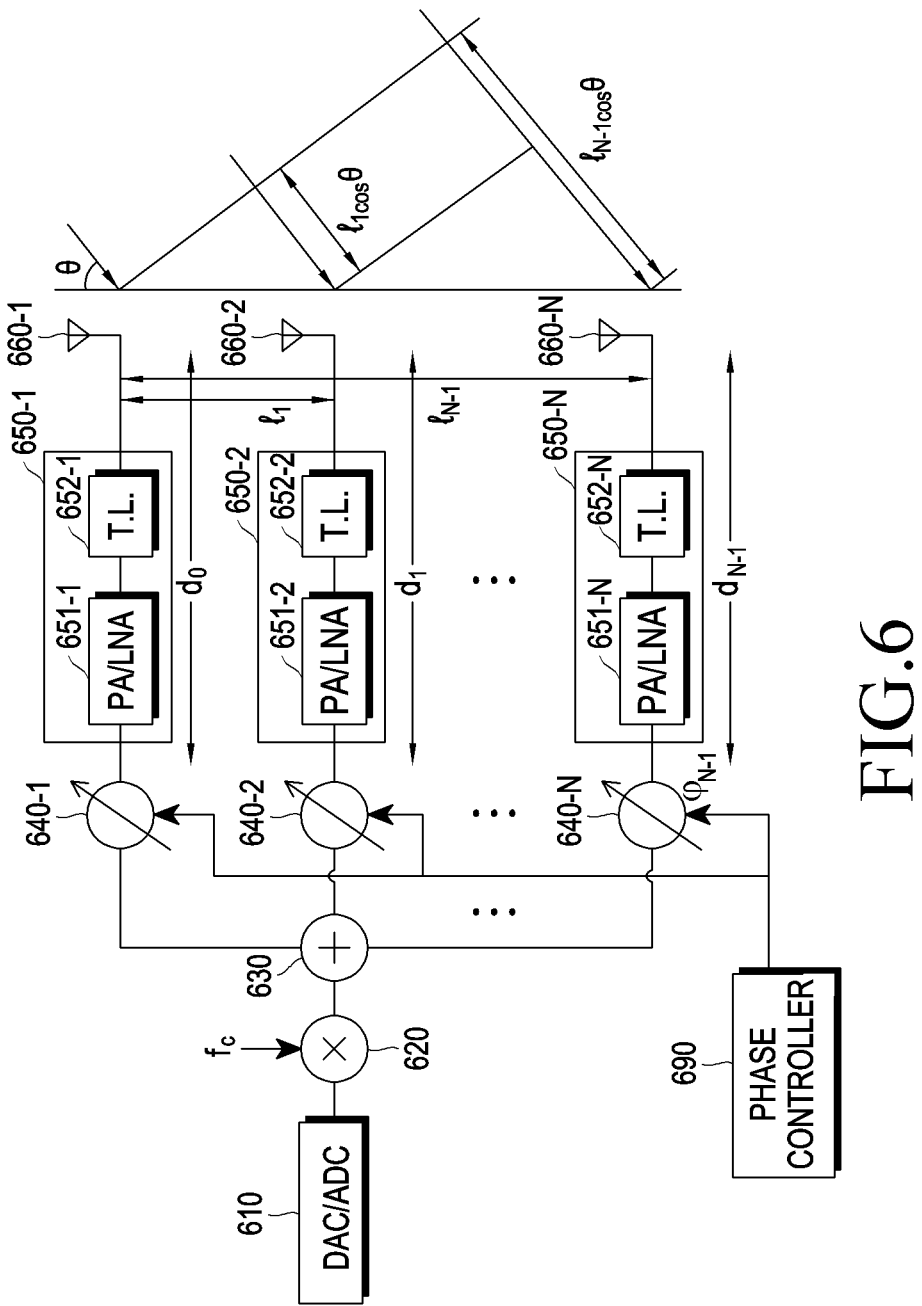
FIG. 6 is a diagram illustrating an example structure of an antenna module for generation of a reception beam in an electronic device according to various embodiments.

FIG. 6 is a diagram illustrating an example structure of an antenna module for generation of a reception beam in an electronic device according to various embodiments. Referring to FIG. 6, an electronic device 601 (e.g., the electronic device 101) may include at least one of a digital to analog converter (DAC)/analog to digital converter (ADC) 610, a mixer 620, a combiner/divider 630, phase shifters 640-1, 640-2 to 604-N, reception signal processing circuits 650-1, 650-2 to 650-N, antenna elements 660-1, 660-2 to 660-N, or a phase controller 690 according to various embodiments.

According to various embodiments, the phase controller 690 may be included in the processor 120 or the second communication processor 214 of FIG. 4. According to various embodiments, the DAC/ADC 610 may be included in the second communication processor 214 or the fourth RFIC 228 of FIG. 4. According to various embodiments, the mixer 620 may be included in the fourth RFIC 228, and the combiner/divider 630 may be included in the fourth RFIC 228 or the third antenna module 246. According to various embodiments, the phase shifters 640-1 to 604-N and the reception signal processing circuits 650-1 to 650-N may be included in the third antenna module 246. The phase shifters 640-1 to 604-N may correspond to the phase shifters 413-1 to 413-4 of FIG. 4, and the antenna elements 660-1 to 660-N may correspond to antenna elements 417-1 to 417-4 of FIG. 4.

According to various embodiments, a transmission (Tx) signal (e.g., an uplink signal) transmitted from the electronic device to the base station may be converted from a digital signal to an analog signal through the DAC/ADC 610, and the analog signal may be mixed with a carrier frequency (fc) in the mixer 620 to be frequency-modulated. The transmission signal modulated with the carrier frequency may be divided as many as the number (e.g., N) of the antenna elements 660-1 to 660-N through the combiner/divider 630.

According to various embodiments, the transmission signal divided through the combiner/divider 630 may be signal processed along a transmission path for each antenna element and transmitted. For example, a signal to be transmitted to the first antenna element 660-1 may be processed such that a signal divided in the combiner/divider 630 is phase-shifted through the first phase shifter 640-1, and the phase-shifted signal is subject to transmission signal processing through the first transmission/reception signal processing circuit 650-1 and then may be transmitted through the first antenna element 660-1. The first transmission/reception signal processing circuit 650-1 may include a power amplifier (PA)/low noise amplifier (LNA) 651-1 and a transmission line (TL) 652-1. According to various embodiments, the phase-shifted signal through the first phase shifter 640-1 is amplified into a signal having a configured size through the power amplifier (PA)/low noise amplifier (LNA) 651-1, and then may be transmitted to the first antenna element 660-1 through the TL 652-1.

According to various embodiments, a signal to be transmitted to the second antenna element 660-2 may be processed such that a signal divided in the combiner/divider 630 is phase-shifted through the second phase shifter 640-2, and the phase-shifted signal is subject to transmission signal processing through the second transmission/reception signal processing circuit 650-2 and then may be transmitted through the second antenna element 660-2. The second transmission/reception signal processing circuit 650-2 may include a power amplifier (PA)/low noise amplifier (LNA) 651-2 and a transmission line (TL) 652-2. According to various embodiments, the phase-shifted signal through the second phase shifter 640-2 is amplified into a signal having a configured size through the power amplifier (PA)/low noise amplifier (LNA) 651-2, and then may be transmitted to the second antenna element 660-2 through the TL 652-2.

According to various embodiments, a signal to be transmitted to the Nth antenna element 660-N may be processed such that a signal divided in the combiner/divider 630 is phase-shifted through the Nth phase shifter 640-N, and the phase-shifted signal is subject to transmission signal processing through the Nth transmission/reception signal processing circuit 650-N and then may be transmitted through the Nth antenna element 660-N. The Nth transmission/reception signal processing circuit 650-N may include a power amplifier (PA)/low noise amplifier (LNA) 651-N and a transmission line (TL) 652-N. According to various embodiments, the phase-shifted signal through the second phase shifter 640-N is amplified into a signal having a configured size through the power amplifier (PA)/low noise amplifier (LNA) 651-N, and then may be transmitted to the Nth antenna element 660-N through the TL 652-N.

Each of the first phase shifters 640-1 to Nth phase shifters 640-N may receive a control signal related to a phase shift from the phase controller 690, and may shift signals divided in the combiner/divider 630 into different phase values according to the received control signal. By performing phase adjustment for each antenna element with regard to signals transmitted to the antenna elements 660-1 to 660-N, respectively, a signal transmission/reception gain in a desired direction can be maximized and/or improved.

According to various embodiments, in the 5G wireless communication system, when performing signal transmission and reception in the mmWave frequency (e.g., above 6 GHZ) band, a multi-antenna-based beamforming technology as shown in FIG. 6 may be used to overcome high signal attenuation. The above beamforming technique may enable a signal transmission/reception gain in a direction to be desired to be maximized and/or improved through phase adjustment for each of antenna elements 660-1 to 660-N. The electronic device may dynamically select the most suitable beam according to the current radio channel condition through a beam management operation during signal transmission or reception to or from the base station and use the selected beam in beamforming.

Figure 7:
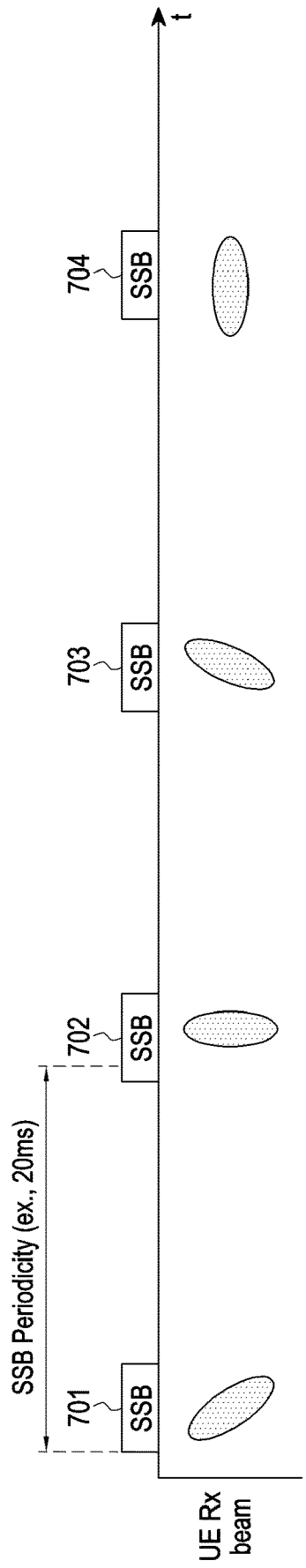
FIG. 7 is a diagram illustrating an example method for selecting a reception beam in an electronic device according to various embodiments.

FIG. 7 is a diagram illustrating an example method for selecting a reception beam in an electronic device according to various embodiments. Referring to FIG. 7, a base station may periodically transmit a reference signal (e.g., a synchronization signal block (SSB)) corresponding to each configured frequency bandwidth (e.g., 100 MHz). According to various embodiments, the base station may transmit at least one SSB within 5 ms duration every 20 ms. The number of times of SSB transmission or symbol length within the 5 ms duration may be configured differently according to a frequency band and/or subcarrier spacing (SCS).

According to various embodiments, the base station may sequentially transmit SSBs via multiple transmission beams (e.g., 64 transmission beams) having different transmission directions in a first SS/PBCH block(s) (hereinafter referred to as SSB) transmission duration 701 (e.g., SSB measurement time configuration (SMTC) duration). The electronic device may sequentially receive, via the first reception beam of the electronic device, SSBs transmitted via the multiple transmission beams (e.g., 64 transmission beams) having different transmission directions in the first SSB transmission duration 701. The base station may sequentially transmit SSBs via multiple transmission beams (e.g., 64 transmission beams) having different transmission directions in a second SSB transmission duration 702. The electronic device may sequentially receive, via the second reception beam of the electronic device, SSBs transmitted via the multiple transmission beams (e.g., 64 transmission beams) having different transmission directions in the second SSB transmission duration 702. The base station may sequentially transmit SSBs via multiple transmission beams (e.g., 64 transmission beams) having different transmission directions in a third SSB transmission duration 703. The electronic device may sequentially receive, via the third reception beam of the electronic device, SSBs transmitted via the multiple transmission beams (e.g., 64 transmission beams) having different transmission directions in the third SSB transmission duration 702. The base station may sequentially transmit SSBs via multiple transmission beams (e.g., 64 transmission beams) having different transmission directions in a fourth SSB transmission duration 704. The electronic device may sequentially receive, via the fourth reception beam of the electronic device, SSB transmitted through the multiple transmission beams (e.g., 64 transmission beams) having different transmission directions in fourth second SSB transmission duration 704. Although it has been described in FIG. 7 that the electronic device receives SSBs transmitted via multiple transmission beams using four reception beams, respectively, the number of reception beams configurable in the electronic device is not limited to the above number, and may be configured variously.

The electronic device (e.g., the electronic device 101) may measure reception signal strengths for each combination of the transmission beams (e.g., 64 transmission beams) of the base station and the reception beams (e.g., 10 reception beams) of the electronic device, and then may determine that a combination having the greatest reception signal strength in the current state is a beam pair to be used for current data transmission/reception.

Figure 8:
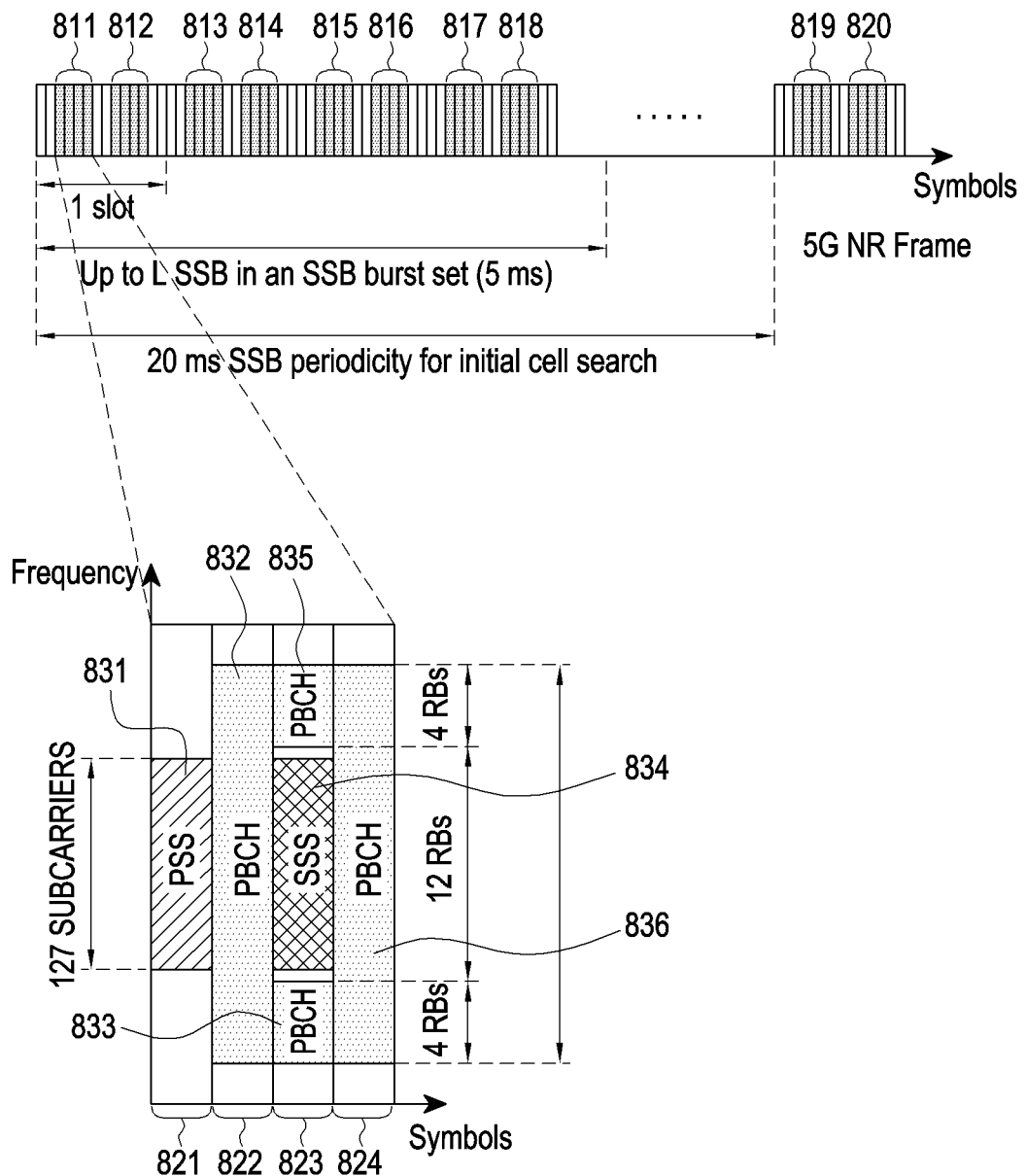
FIG. 8 is a diagram illustrating an example structure of SSBs transmitted from a base station according to various embodiments.

FIG. 8 is a diagram illustrating an example structure of SSBs transmitted from a base station according to various embodiments. Referring to FIG. 8, a base station may periodically transmit SSBs according to various embodiments. For example, the base station may transmit SSBs 811, 812, 813, 814, 815, 816, 817, 818, 819, and 820, as shown in FIG. 8. For example, although FIG. 8 illustrates an example in which the base station transmits two SSBs in one slot, for example, 14 symbols, it will be understood by those skilled in the art that there is no limitation to the number of SSBs in one slot. The base station may transmit L SSBs, and the L SSBs may be referred to as an SSB burst set. The length of the SSB burst set may be 5 ms, and the transmission period of the SSB burst set may be 20 ms, but there is no limitation thereto. The base station may form the L SSBs of the SSB burst set using different beams, and this may be expressed as that the base station performs beam-sweeping. The base station may form SSBs of the SSB burst set in different directions based on digital beamforming and/or analog beamforming. Through the beam sweeping of the base station, the transmission coverage of the SSB can be increased.

According to various embodiments, a first symbol 821 of the SSB 811 may include a primary synchronization signal (PSS) 831, a second symbol 822 may include a first part 832 of a physical broadcast channel (PBCH), a third symbol 823 may include a second part 833 of the PBCH, a secondary synchronization signal (SSS) 834, and a third part 835 of the PBCH, and the fourth symbol 824 may include a fourth part 836 of the PBCH.

According to various embodiments, the electronic device 101 (e.g., at least one of the processor 120, the first communication processor 212, the second communication processor 214, the integrated communication processor 260, or the integrated SoC) may select the optimal SSB. For example, the electronic device 101 may measure the reception strength of each of the SSBs 811, 812, 813, 814, 815, 816, 817, 818, 819, and 820 formed by the base station. Since each of the SSBs 811, 812, 813, 814, 815, 816, 817, 818, 819, and 820 is formed via a different beam, strengths measured by the electronic device 101 may be different. The electronic device 101 may select, for example, an SSB having the maximum reception strength. The electronic device 101 may identify, for example, an SSB index measured as the maximum reception strength, and the SSB index may be used interchangeably with a beam index. The electronic device 101 may report information on the selected beam index to the base station.

Figure 9:
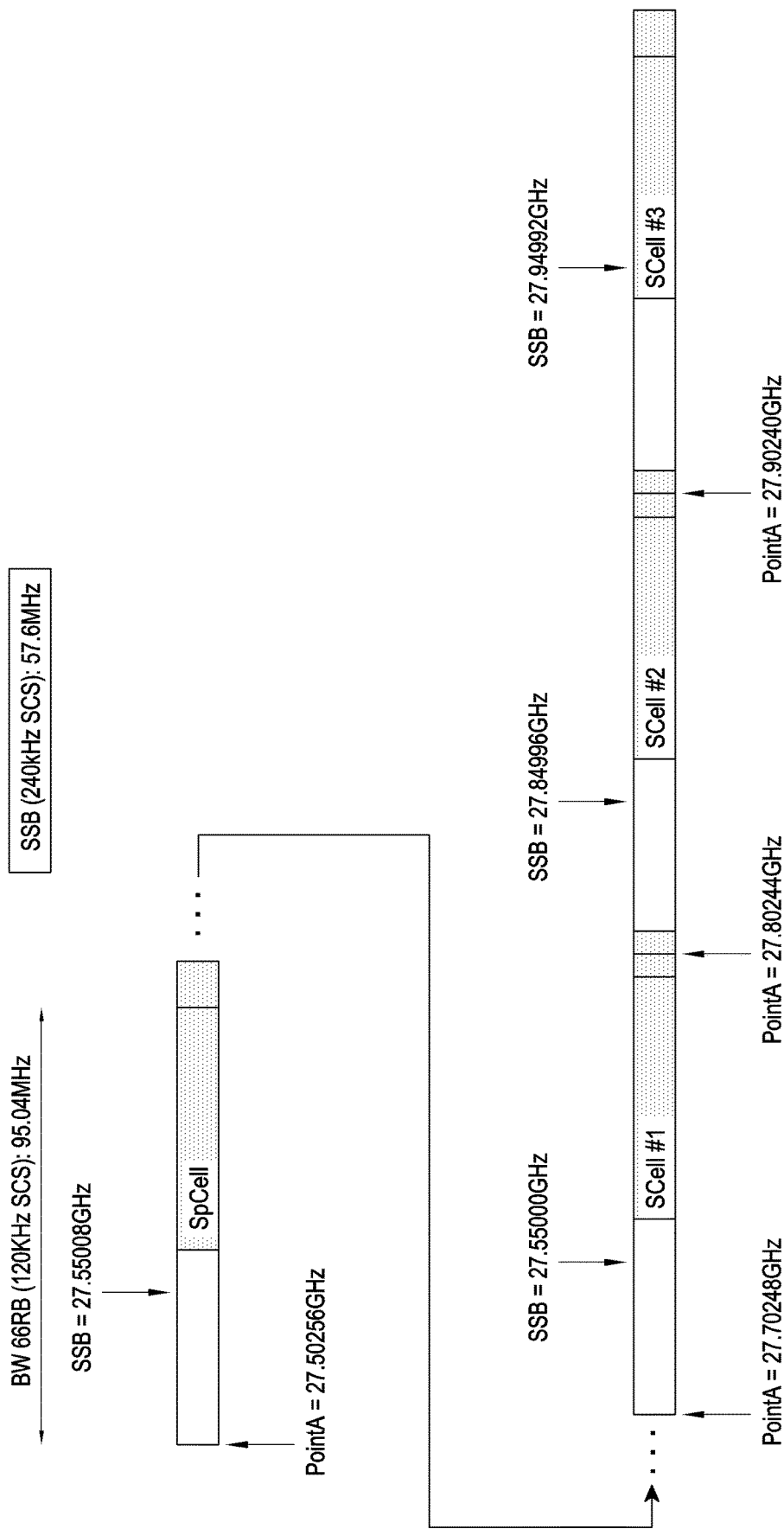
FIG. 9 is a diagram illustrating example SSB transmissions with regard to multiple CCs supporting CA according to various embodiments.

FIG. 9 is a diagram illustrating example SSB transmissions with regard to multiple CCs supporting CA according to various embodiments. According to various embodiments, a 5G wireless communication system that operates a wide frequency band transmits data through multiple component carriers (CCs) using a carrier aggregation (CA) method, thereby providing a high data rate.

Referring to FIG. 9, a communication service provider may provide a service by dividing 800 MHz bandwidth of 27.5 GHZ to 28.3 GHz frequency bands into eight 100 MHz bandwidths. For example, each electronic device (e.g., the electronic device 101 of FIG. 1) may receive one or multiple frequency bandwidths among the divided eight 100 MHz bandwidths and transmit/receive data therethrough. A base station integrates the multiple 100 MHz bandwidths to serve one electronic device, thereby providing a high data rate. Here, each CC may be referred to as a cell, one CC may be referred to as a primary CC (PCell or SpCell), and other CCs may be referred to as secondary CCs (SCells). The base station may activate and operate a larger number of CCs in an electronic device requiring a higher data rate, and thus may effectively distribute the load for multiple electronic devices within the coverage of the base station.

According to various embodiments, a corresponding SSB may be transmitted in each CC of the multiple CCs. For example, as shown in FIG. 9, each CC has the bandwidth of 95.04 MHz and may include 66 resource blocks (RBs) if the SCS of each subcarrier is 120 kHz. Here, if the SCS of the subcarrier of the SSB transmitted corresponding to each CC is 240 kHz, the SSB may be transmitted through 20 RBs each of which includes 12 subcarriers, and the 20 RBs have a bandwidth of 57.6 MHz.

Figure 10:
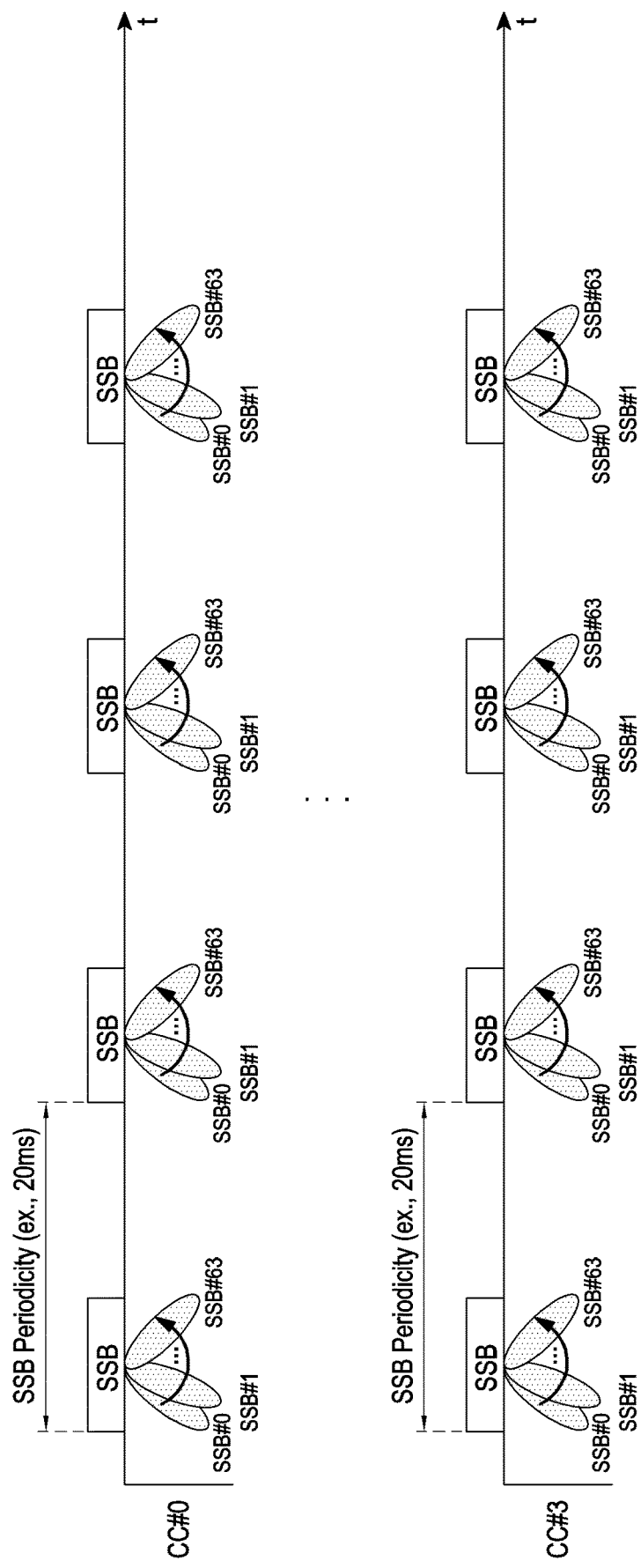
FIG. 10 is a diagram illustrating an example of SSB transmission in each CC according to various embodiments.

FIG. 10 is a diagram illustrating an example of SSB transmission in each CC according to various embodiments. Referring to FIG. 10, as described in FIG. 7, a base station may periodically transmit a reference signal (e.g., a synchronization signal block (SSB)) with regard to each CC having a configured bandwidth (e.g., 100 MHz bandwidth). As described above in FIG. 9, the SSB may be individually transmitted for each CC. According to various embodiments, a period in which the SSB is transmitted, transmission timing of the SSB, and the number of SSB transmissions with regard to the multiple CCs may be identically or differently configured for each CC. For example, when operating in CA, the electronic device may simultaneously receive signals with respect to multiple activated CCs, and may simultaneously receive multiple SSBs corresponding to the multiple CCs at the same time point. As shown in FIG. 10, the electronic device may, while operating in CA, simultaneously receive SSBs simultaneously transmitted with regard to four CCs (e.g., CC #0, CC #1, CC #2, and CC #3), though at least one antenna module.

According to various embodiments, the electronic device may receive a configured number (e.g., 64) of SSBs with regard to multiple CCs every 20 ms through a configured specific reception beam. For example, as described above in FIG. 7, the base station may sequentially transmit multiple transmission beams (e.g., 64 transmission beams) having different transmission directions with regard to the multiple respective CCs in the first SSB transmission duration 701. The electronic device may sequentially receive, via a first reception beam of the electronic device, the multiple transmission beams (e.g., 64 transmission beams) having different transmission directions with regard to the multiple respective CCs in the first SSB transmission duration 701. Similarly, the base station may sequentially transmit SSBs, transmitted through multiple transmission beams (e.g., 64 transmission beams), in each of the second SSB transmission duration 702, the third SSB transmission duration 703, and the fourth SSB transmission duration 704. The electronic device may configure a second reception beam in the second SSB transmission duration 702, configure a third reception beam in the third SSB transmission duration 703, and configure a fourth reception beam in the fourth SSB transmission duration 704. The electronic device may receive SSBs, transmitted via the multiple transmission beams (e.g., 64 transmission beams) having different transmission directions with regard to the multiple respective CCs, using a second reception beam, a third reception beam, and a fourth reception beam, which are configured differently for each transmission duration.

In FIG. 10, if it is assumed by way of non-limiting example that the number of CCs is 4, the number of SSBs is 64, and the number of reception beams configured in the electronic device is 10 (e.g., a first reception beam (Beam 0), a second reception beam (Beam 1), . . . , and 10th reception beam (Beam 9)), the reception signal strengths measured in each combination of transmission beam and reception beam may be identified as shown in <Table 1> below.

TABLE 1

|  | CC0 | | CC1 | | CC2 | | CC3 | |
| --- | --- | --- | --- | --- | --- | --- | --- | --- |
|  | SSB0 ... SSB63 | SSB0 ... SSB63 | SSB0 ... SSB63 | SSB0 ... SSB63 |
| Module Beam0 | −70 ... −77 | −75 ... −80 | −72 ... −79 | −73 ... −83 |
| ⋮ | ⋮ ⋮ ⋮ | ⋮ ⋮ ⋮ | ⋮ ⋮ ⋮ | ⋮ ⋮ ⋮ |
| Beam9 | −90 ... −65 | −88 ... −90 | −92 ... −70 | −85 ... −72 |

Referring to <Table 1>, the electronic device may determine that a combination having the largest reception signal strength among combinations of multiple transmission beams (e.g., SSB 0 to SSB 63) and multiple reception beams (e.g., Beam 0 to Beam 9) is a reception beam and a transmission beam for data transmission for each CC. For example, with regard to the first CC (CC 0), the reception signal strengths corresponding to a case in which 64 SSBs are received via each of the 10 reception beams may be identified as shown in <Table 1> above, and a combination of a transmission beam and a reception beam having the highest large signal strength among the 640 reception signal strengths may be configured as a beam pair for data transmission/reception. With regard to the second CC (CC 1), the third CC (CC 2), and the fourth CC (CC 3), configuration can be made according to the same method above.

According to various embodiments, if it is assumed that the transmission period of the SSB is 20 ms as illustrated in FIG. 10, data regarding the 10 reception beams in <Table 1> may be acquired within 200 ms. The electronic device may determine the optimal transmission beam and reception beam by updating the data of <Table 1> every 200 ms.

According to various embodiments, the optimal reception beam may be determined differently for each CC, and the electronic device may mount a smaller number of antenna modules than the number of CCs. For example, if the electronic device includes two antenna modules, the optimal antenna module and reception beam for each CC may be determined as shown in <Table 2> below.

TABLE 2

| CA component | CC #0 | CC #1 | CC #2 | CC #3 |
| --- | --- | --- | --- | --- |
| Reception beam/antenna module | 0/0 | 2/0 | 3/1 | 7/1 |

Referring to <Table 2>, with regard to CC #0, a first reception beam (Beam 0) of a first antenna module (module #0) may be determined as the optimal reception beam, with regard to CC #1, a third reception beam (Beam 2) of a first antenna module (module #0) may be determined as the optimal reception beam, with regard to CC #2, a fourth reception beam (Beam 3) of a second antenna module (module #1) may be determined as the optimal reception beam, and with regard to CC #3, an eighth reception beam (Beam 7) of the second antenna module (module #1) may be determined as the optimal reception beam.

According to various embodiments, under an assumption that each antenna module may form one reception beam, if the optimal reception beams determined for respective CCs are different from each other as shown in <Table 2>, the optimal reception beam may be configured by considering the number of antenna modules and the number of CCs.

Hereinafter, with reference to FIGS. 11, 12, and 13, when operating in a CA, if the number of antenna modules installed in the electronic device is less than the number of CCs, embodiments in which the electronic device determines an optimal reception beam for each CC will be described.

Figure 11:
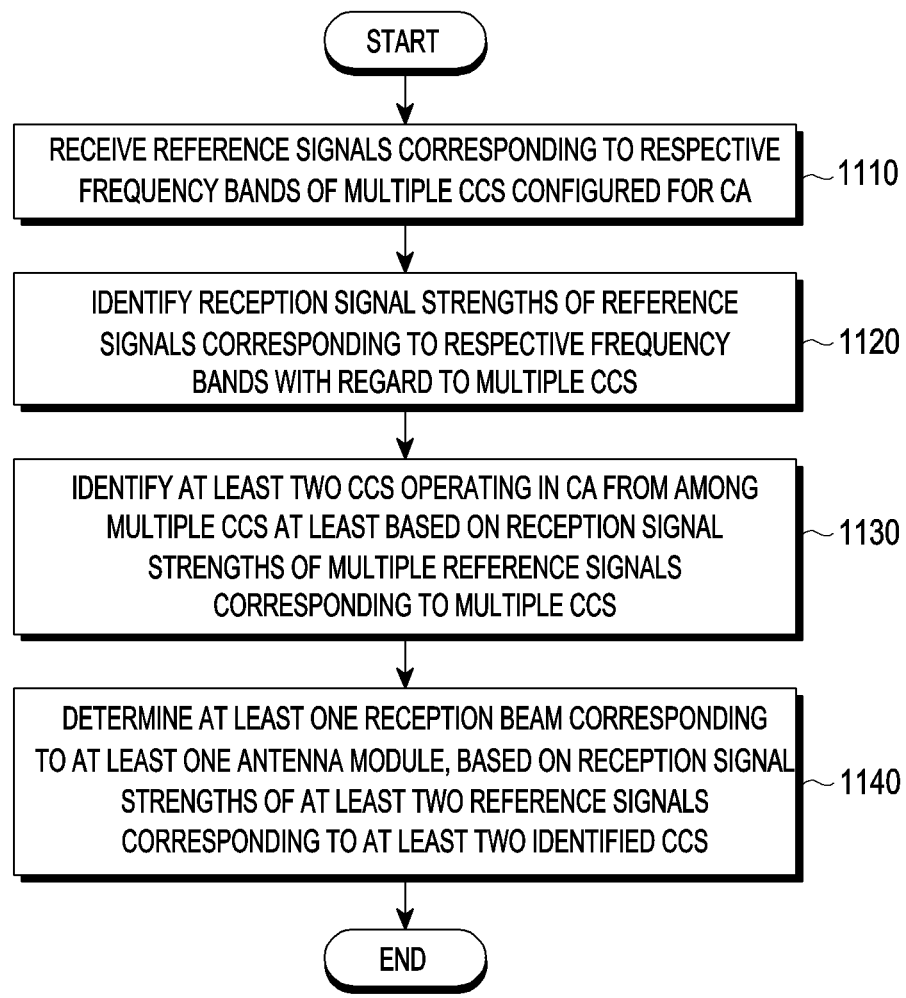
FIG. 11 is a flowchart illustrating an example method of operating an electronic device according to various embodiments.

FIG. 11 is a flowchart illustrating an example method of operating an electronic device according to various embodiments. The electronic device 101 may be connected to a base station and receive an RRC reconfiguration message (e.g., an RRCReconfiguration message) for performance of a CA operation. The RRC reconfiguration message for the CA operation transmitted from the base station may include an information element as shown in <Table 3> below.

TABLE 3

```
CellGroupConfig Information element
CellGroupConfig ::= SEQUENCE {
cellGroupID
rlc-BearerToAddModList SEQUENCE (SIZE(1..maxLC-ID)) OF RLC-BearerConfig
rlc-BearerToReleasedList SEQUENCE (SIZE(1..maxLC-ID)) OF LogicalChannelIdentity
mac-CellGroupConfig
physicalCellGroupConfig
spCellConfig
sCellToAddModList SEQUENCE (SIZE (1..maxNrofSCells)) of
SCellConfig
sCellToReleaseList SEQUENCE (SIZE (1..maxNrofSCells)) of SCellIndex
...
[[
reportUplinkTxDirectCurrent ENUMERATED { true }
}
SCellConfig ::= SEQUENCE {
sCellIndex SCellIndex,
sCellConfigCommon ServingCellConfigCommon
sCellConfigDedicated ServingCellConfig
...,
[[
smtc SSB-MTC
}
```

According to various embodiments, if CA-related information (e.g., information related to SCell configuration) is not included in the information element of the RRC reconfiguration message illustrated in <Table 3>, there is no CA support. Therefore, the electronic device 101 may not perform at least some of the operations according to various embodiments to be described later. The CA-related information may be included in the RRC reconfiguration message in the form of "sCellToAddModList" as illustrated in <Table 1> above.

Referring to FIG. 11, the electronic device 101 may receive multiple reference signals (e.g., SSB signals) from a base station with regard to each CC of multiple CCs configured for CA, in operation 1110. For example, the electronic device 101 may receive multiple reference signals (e.g., SSB signals) with regard to respective frequency bands of multiple CCs configured for CA.

In operation 1120, the electronic device may identify the reception signal strength of a reference signal corresponding to each of frequency bands, with regard to multiple CCs, based on CA-related information (e.g., information related to SCell configuration) included in the information element of the RRC reconfiguration message. The reception signal strength may be identified as shown in <Table 1> above.

According to various embodiments, in operation 1130, the electronic device 101 may identify at least two CCs operating in the CA from among the multiple CCs at least based on the identified reception signal strengths of the multiple reference signals.

According to various embodiments, in operation 1140, the electronic device 101 may determine at least one reception beam corresponding to at least one antenna module, based on the reception signal strengths of the at least two identified reference signals.

Various embodiments in which the electronic device identifies at least two CCs in operation 1130 and determines at least one reception beam in operation 1140 will be described in detail with reference to FIGS. 12 and 13 below.

Figure 12:
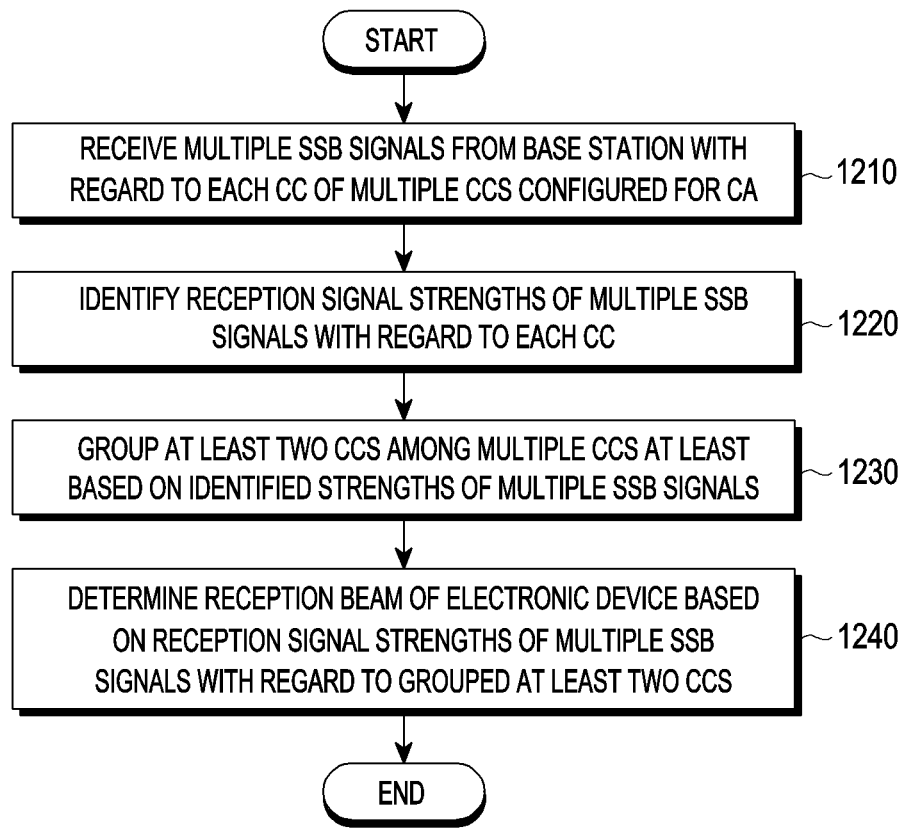
FIG. 12 is a flowchart illustrating an example method of operating an electronic device according to various embodiments.

FIG. 12 is a flowchart illustrating an example method of operating an electronic device according to various embodiments. The electronic device 101 may be connected to the base station and receive an RRC reconfiguration message (e.g., an RRCReconfiguration message) for performance of a CA operation. The RRC reconfiguration message for CA operation transmitted from the base station may include an information element as shown in <Table 3> above.

According to various embodiments, if CA-related information (e.g., information related to SCell configuration) is not included in the information element of the RRC reconfiguration message illustrated in <Table 3>, there is no CA support. Therefore, the electronic device 101 may not perform at least some of the operations according to various embodiments to be described later.

Referring to FIG. 12, the electronic device 101 may receive multiple reference signals (e.g., SSB signals) from a base station with regard to each CC of multiple CCs configured for CA in operation 1210. In operation 1220, the electronic device may identify the reception signal strengths of multiple SSB signals with regard to multiple respective CCs, based on CA-related information (e.g., information related to SCell configuration) included in the information element of the RRC reconfiguration message. The reception signal strength may be identified as shown in <Table 1> above. Hereinafter, for convenience of explanation, it may be assumed that, as a result of measuring the reception signal strengths of the multiple SSB signals for each CC with regard to multiple reception beams, the optimal transmission beam is determined as SSB 0, and the optimal reception beam is determined as Beam 3.

According to various embodiments, <Table 1> described above indicates the result of measurement, which is performed using 10 reception beams with regard to 4 CCs, and <Table 4> below may indicate a case of measurement using seven reception beams.

TABLE 4

| | Reception signal strength (dBm) | | | |
|---|---|---|---|---|
| UE Rx Beam | CC0 SSB0 | CC1 SSB0 | CC2 SSB0 | CC3 SSB0 |
| Beam 0 | −60 | −73 | −86 | −82 |
| Beam 1 | −66 | −77 | −88 | −85 |
| Beam 2 | −55 | −69 | −84 | −81 |
| Beam 3 | −54 | −67 | −83 | −80 |
| Beam 4 | −56 | −70 | −85 | −84 |
| Beam 5 | −64 | −78 | −88 | −86 |
| Beam 6 | −65 | −76 | −87 | −83 |

Referring to <Table 4>, with regard to the same transmission beam (SSB 0), the reception signal strength of each reception beam may be different for each CC. As described above, if the number of antenna modules installed in the electronic device is less than the number of CCs, it may not be possible to generate an optimal reception beam for each CC.

According to various embodiments, in operation 1230, the electronic device 101 may group at least two CCs among the multiple CCs at least based on the identified strengths of the multiple SSB signals. Here, a case of grouping the multiple CCs into one CC group is not excluded. As described above in the description of FIG. 10, SSB transmission may occur in the same period and/or at the same time for each CC, and the number of transmitted SSBs may be the same for each CC. According to various embodiments, if it is assumed that the base station (e.g., a 5G base station supporting mmWave) transmits SSBs for the total frequency band of CA using the same antenna panel, SSBs transmitted for each CC may have similar physical directions. According to various embodiments, the electronic device 101 may determine whether physical directions of signals for each CC are similar to each other, and may group at least two CCs having a similar physical direction.

According to various embodiments, when selecting an optimal reception beam, the electronic device 101 may use the reception signal strengths for the SSBs of the grouped CCs. For example, in <Table 1>, the reception signal strengths of SSB 0 of CC 0/1/2/3, measured using the first reception beam (Beam 0), are -70/-75/-72/-73, and the absolute measurement values may be different from each other. However, due to similar physical directionality, when performing measurement by changing a reception beam, the reception signal strengths may have similar tendencies in improvement or deterioration thereof. As such, by grouping CCs having similar tendencies, the time required for measuring the received beam by an electronic device can be shortened.

For example, in various non-LOS user environments, in most cases, a wide range of new signal strengths can be measured. Here, the electronic device can make a determination as to whether a specific beam among configurable multiple reception beams is good, after identification of results of multiple measurements in order to prevent and/or reduce a ping-pong phenomenon. As described above, if the electronic device determines the reception beam through multiple measurements, a long time equal to the multiplication of the number of times of measurements and the SSB transmission period may be required.

According to various embodiments, when CCs having similar tendencies are grouped, it is possible to compare the results of measuring signals in a similar direction multiple times during one SSB transmission period, to thereby obtain time benefits in the reception beam selection operation of the electronic device.

Hereinafter, embodiments of grouping multiple CCs in the electronic device will be described. According to various embodiments, if the reception signal strength for each CC is measured as shown in <Table 4> above, the sequence of reception signal strengths according to each reception beam may be shown in <Table 5> below.

TABLE 5

| UE Rx Beam | Ranking | | | |
|---|---|---|---|---|
| | CC0 SSB0 | CC1 SSB0 | CC2 SSB0 | CC3 SSB0 |
| Beam 0 | 4 | 4 | 4 | 3 |
| Beam 1 | 7 | 7 | 6 | 6 |
| Beam 2 | 2 | 2 | 2 | 2 |
| Beam 3 | 1 | 1 | 1 | 1 |
| Beam 4 | 3 | 3 | 3 | 5 |
| Beam 5 | 6 | 6 | 6 | 7 |
| Beam 6 | 5 | 5 | 5 | 4 |

Referring to <Table 5>, the absolute reception signal strengths for each CC are different, with regard to the same transmission beam (SSB 0) and each of reception beams, as shown in <Table 4> above. However, the sequence of the reception signal strengths for each reception beam may be the same or similar. For example, in <Table 5>, it can be seen that CC 0, CC 1, and CC 2 have almost the same sequence of reception signal strengths for each reception beam. From the results of <Table 5>, CC 0, CC 1, and CC 2 may be determined to have similar tendencies and may be grouped into one group.

According to various embodiments, in operation 1240, the electronic device 101 may determine a reception beam of the electronic device based on reception signal strengths of multiple SSB signals with regard to the grouped at least two CCs.

For example, since it is determined that the grouped CC 0, CC 1, and CC 2 have a similar tendency, if the reception signal strengths of reception beams of each of the grouped CC 0, CC 1, and CC 2 are changed in the same sequence at the same time, the electronic device may change (or determine) a reception beam based on the same. On the other hand, if the reception signal strength sequence is changed with regard to only one CC among the grouped CC 0, CC 1, and CC 2, it is determined that this is a temporary change, and the reception beam change can be withheld.

According to various embodiments, the electronic device 101 may group CCs by calculating a correlation between CCs as shown in <Table 6> below.

TABLE 6

| | Correlation Example of mathematical expression = $\frac{x^T y}{\|x\|\|y\|}$ | | | |
|---|---|---|---|---|
| UE Rx Beam | CC0 SSB0 | CC1 SSB0 | CC2 SSB0 | CC3 SSB0 |
| Beam 0 | 1 | 0.9996 | 0.9983 | 0.9980 |

Referring to <Table 6>, a correlation between CC 0 and CC 1 may be calculated as 0.9996, a correlation between CC 0 and CC 2 may be calculated as 0.9983, and a correlation between CC 0 and CC 3 may be calculated as 0.9980. According to various embodiments, the electronic device 101 may group at least one CC (e.g., CC 1), having the highest correlation, with CC 0. As another method, the electronic device 101 may group at least one CC, having a correlation equal to or greater than a configured value (e.g., 0.9990), with CC 0.

Figure 13:
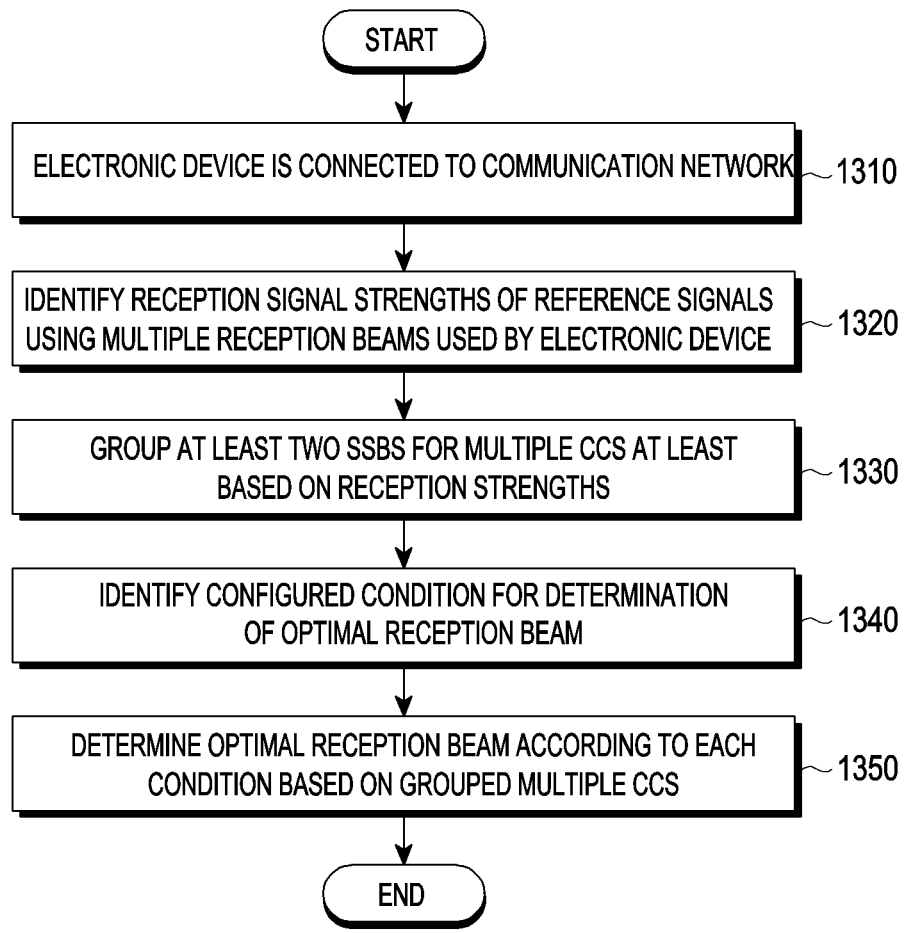
FIG. 13 is a flowchart illustrating an example method of operating an electronic device according to various embodiments.

FIG. 13 is a flowchart illustrating an example method of operating an electronic device according to various embodiments. Referring to FIG. 13, the electronic device 101 is connected to a communication network (e.g., a base station) in operation 1310, and may identify the reception signal strengths of multiple reference signals (or criterion signals) (e.g., SSBs) for each CC using multiple reception beams configured in the electronic device in operation 1320. The reception signal strengths may be identified as shown in <Table 1> above. Hereinafter, for convenience of explanation, it may be assumed that, as a result of measuring the reception signal strengths of the multiple SSB signals for each CC, with regard to each of the multiple reception beams, the optimal transmission beam is determined as SSB 0, and the optimal reception beam is determined as Beam 3.

According to various embodiments, <Table 1> described above is a result of measurement, which is performed using 10 reception beams with regard to 4 CCs, and if the measurement is performed using 7 reception beams, the result is identified as shown in <Table 4> above.

According to various embodiments, in operation 1330, the electronic device 101 may group at least two CCs among the multiple CCs at least based on the identified strengths of the multiple SSB signals. Since the embodiment of grouping the multiple CCs is described above with reference to FIG. 12, a detailed description thereof will be omitted.

According to various embodiments, the electronic device 101 may identify a configured condition for determination of an optimal reception beam in operation 1340. The electronic device 101 may determine an optimal reception beam according to each condition based on the grouped multiple CCs in operation 1350.

According to various embodiments, the conditions for determining the optimal reception beam may be determined at least based on reception signal strengths (e.g., RSRP, SINR, and RSRQ) currently measured for each CC and variation (e.g., standard deviation, difference between the maximum and minimum, and interference amount), network configuration values (e.g., the number of CCs during CA operation, and the number and/or strength of SSBs), and user interaction (e.g., a stationary state, a state of walking, a state of being held by a hand, and a state of receiving a call) that can be identified through sensor values (e.g. grip sensor, gravity sensor, gyro sensor, and proximity sensor). Hereinafter, various example embodiments of conditions for determining the optimal reception beam will be described.

According to various embodiments, the electronic device 101 may be configured to simultaneously receive data through multiple CCs during CA operation, and to transmit data through one CC (e.g., PCell). If transmission power (Tx power) has a value equal to or greater than a configured value or the error probability has a value equal to or greater than the configured value, an optimal reception beam may be determined based on a CC (e.g., PCell) configured for data transmission in order to perform stable data transmission of the electronic device 101. For example, if the PCell among the multiple CCs is CC 0, the electronic device may determine that a reception beam having the largest reception signal strength of the SSB with regard to CC 0 is a reception beam regarding multiple CCs.

According to various embodiments, after identification of the channel state of the electronic device with regard to each CC, the electronic device 101 may determine that a reception beam having the highest total downlink data rate is a reception beam regarding multiple CCs. According to various embodiments, when identifying the total downlink data rate, the data rate using all CCs configured for the electronic device 101 may be considered, and the data rate using CCs in an activated state may be considered.

According to various embodiments, the electronic device 101 may determine that a reception beam that maximizes the reception signal strength with regard to a CC having the smallest reception signal strength of each reception beam, among the multiple CCs, is a reception beam regarding multiple CCs. If the consideration above is made, stable data reception above a predetermined level with regard to all CCs may be possible.

According to various embodiments, the electronic device 101 may determine that a reception beam having the largest average value of reception signal strengths with regard to multiple CCs is a reception beam regarding multiple CCs.

According to various embodiments, the electronic device 101 may select an optimal reception beam for each CC with regard to the multiple CCs, and may determine that a reception beam selected by the largest number of CCs is a reception beam regarding multiple CCs.

According to various embodiments, the embodiments may be applied by combining at least two embodiments or may be applied sequentially.

For example, the electronic device may determine whether the transmission power (Tx power) has a value equal to or greater than a configured value. If the transmission power has a value greater than or equal to a configured value (e.g., 20 dBm), the transmission performance is not good. Therefore, in order to optimize the transmission performance, the electronic device may determine an optimal reception beam based on the CC (e.g., PCell) configured for data transmission as described above. On the other hand, if the transmission power has a value less than the configured value, one of the other embodiments may be selected and operated. For example, if the scheduling rate or data rate is greater than or equal to a specific threshold, the electronic device may select a reception beam according to an embodiment in which the total downlink data rate is considered.

According to various embodiments, in the above, although an embodiment, in which the 4CC CA base station configuration and one reception beam selection made by one antenna module are used, is taken as an example, an embodiment in which the base station configuration operating based on M CCs and N reception beams are used is possible. Here, it may be assumed that M>N.

<Table 7> below shows an example of selecting two reception beams in an electronic device operating in a CA including 8 CCs, and shows the SSB reception signal strength result for each CC.

TABLE 7

| | | CC0 | | CC1 | | CC2 | | CC3 | |
|---|---|---|---|---|---|---|---|---|---|
| | | SSB0 ... SSB63 | | SSB0 ... SSB63 | | SSB0 ... SSB63 | | SSB0 ... SSB63 | |
| Module 0 | Beam0 | −70 ... | −77 | −75 ... | −80 | −72 ... | −79 | −73 ... | −33 |
| | · | · · | · | · · | · | · · | · | · · | · |
| | · | · · | · | · · | · | · · | · | · · | · |
| | · | · · | · | · · | · | · · | · | · · | · |
| | Beam9 | −90 ... | −65 | −88 ... | −90 | −92 ... | −70 | −85 ... | −72 |

| | | CC4 | | CC5 | | CC6 | | CC7 | |
|---|---|---|---|---|---|---|---|---|---|
| | | SSB0 ... SSB63 | | SSB0 ... SSB63 | | SSB0 ... SSB63 | | SSB0 ... SSB63 | |
| Module 0 | Beam0 | −70 ... | −77 | −75 ... | −80 | −72 ... | −79 | −73 ... | −83 |
| | · | · · | · | · · | · | · · | · | · · | · |
| | · | · · | · | · · | · | · · | · | · · | · |
| | · | · · | · | · · | · | · · | · | · · | · |
| | Beam9 | −90 ... | −65 | −80 ... | −90 | −92 ... | −70 | −85 ... | −72 |

| | | CC0 | | CC1 | | CC2 | | CC3 | |
|---|---|---|---|---|---|---|---|---|---|
| | | SSB0 ... SSB63 | | SSB0 ... SSB63 | | SSB0 ... SSB63 | | SSB0 ... SSB63 | |
| Module 1 | Beam0 | −69 ... | −88 | −81 ... | −95 | −100 ... | −66 | −86 ... | −82 |
| | · | · · | · | · · | · | · · | · | · · | · |
| | · | · · | · | · · | · | · · | · | · · | · |
| | · | · · | · | · · | · | · · | · | · · | · |
| | Beam9 | −91 ... | −77 | −81 ... | −84 | −95 ... | −76 | −80 ... | −71 |

| | | CC4 | | CC5 | | CC6 | | CC7 | |
|---|---|---|---|---|---|---|---|---|---|
| | | SSB0 ... SSB63 | | SSB0 ... SSB63 | | SSB0 ... SSB63 | | SSB0 ... SSB63 | |
| Module 1 | Beam0 | −74 ... | −79 | −85 ... | −82 | −92 ... | −89 | −93 ... | −73 |
| | · | · · | · | · · | · | · · | · | · · | · |
| | · | · · | · | · · | · | · · | · | · · | · |
| | · | · · | · | · · | · | · · | · | · · | · |
| | Beam9 | −80 ... | −73 | −73 ... | −93 | −94 ... | −77 | −81 ... | −73 |

Referring to <Table 7>, CCs corresponding to SSBs may be grouped in the same or similar manner to the method relating to <Table 5> or <Table 6> described above, based on the measurement result, and the electronic device may perform an optimal beam selection operation based on this grouping. According to various embodiments, various conditions for selection of reception beams may be applied in the same manner as in the above-described embodiments. However, different conditions may be selected and applied for each CC as follows.

For example, it is possible to select one reception beam used in the primary CC and another reception beam that maximizes the data rate of the remaining CCs by considering the Tx aspect. For example, it is possible to select beam 9 of module 0 and use the selected beam for the Tx performance of the primary CC, and to use beam 0 of module 1 with regard to the remaining CCs to maximize the data rate.

It is also possible to select two reception beams to increase the total data rate. For example, reception beam selection such that CC 0/1/5/6/7 use beam 3 of module 0 and CC 2/3/4 use beam 2 of module 1 is performed to increase the total data rate of CCs.

Although the above-described embodiments have been described in connection with the downlink, various embodiments can be applied in connection with the uplink in the same or similar manner.

Figure 14:
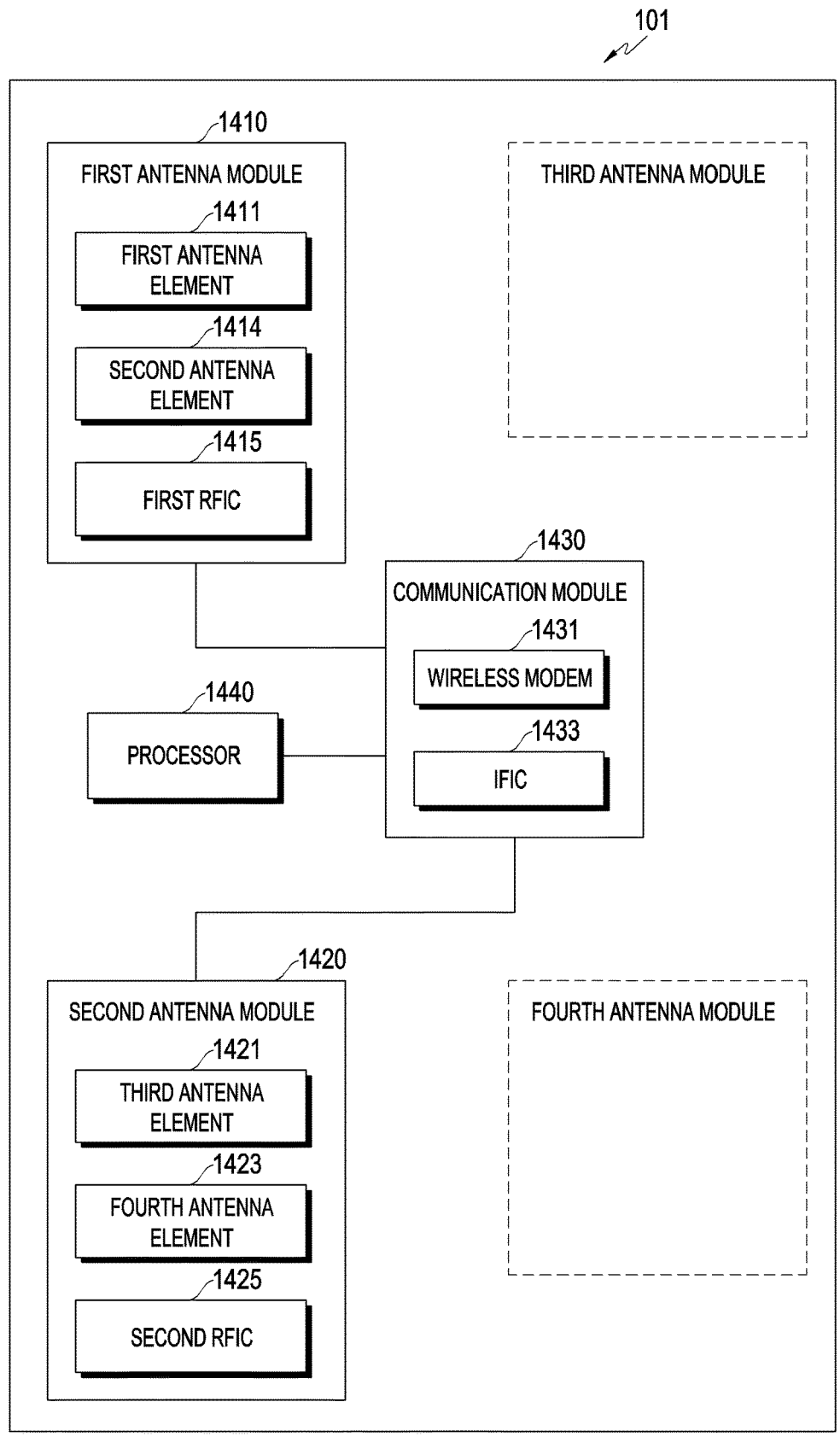
FIG. 14 is a block diagram illustrating an example configuration of an electronic device supporting multiple antenna modules according to various embodiments.

FIG. 14 is a block diagram illustrating an example structure of an electronic device supporting multiple antenna modules according to various embodiments.

Referring to FIG. 14, the electronic device 101 may include a first antenna module (e.g., including at least one antenna) 1410, a second antenna module (e.g., including at least one antenna) 1420, a communication module (e.g., including communication circuitry) 1430, and a processor (e.g., including processing circuitry) 1440.

According to various embodiments, the first antenna module 1410 may include a first antenna element 1411, a second antenna element 1413, and a first radio frequency integrated circuit (RFIC) 1415. The first antenna element 1411 and the second antenna element 1413 may be included in the antenna array 415 illustrated in FIG. 4.

According to various embodiments, the second antenna module 1420 may include a third antenna element 1421, a fourth antenna element 1423, and a second RFIC 1425. The third antenna element 1421 and the fourth antenna element 1423 may be included in the antenna array 415 shown in FIG. 4.

According to various embodiments, the first antenna module 1410 may receive an external signal and convert a frequency band thereof. According to various embodiments, the first antenna module 1410 may receive the external signal using the first antenna element 1411 and/or the second antenna element 1413. The first antenna element 1411 and/or the second antenna element 1413 may form a reception beam for reception of an external signal. According to various embodiments, the first RFIC 1415 may convert the frequency band of the received external signal. For example, the first RFIC 1415 may receive the external signal of a very high frequency (mmWave) band, and may convert the very high frequency band into an intermediate frequency (IF) band. The first RFIC 1415 may transmit the external signal, having been converted to the intermediate frequency band, to the communication module 1430.

Although not shown, the first antenna module 1410 may be disposed on a separate PCB (not shown) distinguished from a main PCB (not shown) on which the processor 1440 and the communication module 1430 are disposed. The separate PCB may be referred to as a first PCB. The first PCB on which the first antenna module 1410 is disposed and the main PCB may be electrically connected to each other through a connection member. The connection member may include a coaxial cable and/or a flexible PCB (FPCB).

According to various embodiments, the second antenna module 1420 may receive an external signal and convert a frequency band thereof. According to various embodiments, the second antenna module 1420 may receive the external signal using the third antenna element 1421 and/or the fourth antenna element 1423. The third antenna element 1421 and/or the fourth antenna element 1423 may form a reception beam for reception of an external signal. According to various embodiments, the second RFIC 1425 may convert the frequency band of the received external signal. For example, the second RFIC 1425 may receive the external signal of the very high frequency band and convert the frequency of the very high frequency band into an intermediate frequency band. The second RFIC 1425 may transmit the external signal, having been converted to the intermediate frequency band, to the communication module 1430.

Although not shown, the second antenna module 1420 may be disposed on a separate PCB (not shown) distinguished from the main PCB (not shown). The separate PCB may be referred to as a second PCB. The second PCB on which the second communication circuit 1420 is disposed and the main PCB may be electrically connected to each other through the coaxial cable and/or a connection member including the FPCB.

Although FIG. 14 illustrates an example in which the first antenna module 1410 includes two antenna elements (e.g., the first antenna element 1411 and the second antenna element 1413), and the second antenna module 1420 includes two antenna elements (e.g., the third antenna element 1421 and the fourth antenna element 1423), this is for convenience of explanation, and the first antenna module 1410 or the second antenna module 1420 may include three or more antenna elements.

According to various embodiments, the communication module 1430 may include various communication circuitry including, for example, an IFIC 1433 and a wireless modem 1431. The wireless modem 1431 may transmit or receive data to or from the IFIC 1433. The wireless modem 1431 may be referred to as various terms including a 5G modem and a communication processor (CP). According to an embodiment, the wireless modem 1431 may transmit a digital to analog conversion (DAC) signal to the IFIC 1433. The DAC signal may correspond to a signal, which is obtained by converting a digital signal transmitted from the processor 1440 to the wireless modem 1431 into an analog signal. The converted analog signal may correspond to a signal of a baseband frequency. According to an embodiment, the wireless modem 1431 may transmit an analog to digital conversion (ADC) signal to the processor 1440. The ADC signal may correspond to a signal, obtained by receiving, from the IFIC 1433, an analog signal, which is received from an external electronic device (e.g., the electronic device 102) and the frequency of which is down converted, and converting the received analog signal into a digital signal.

According to various embodiments, the IFIC 1433 may convert a frequency band and transmit/receive a signal to/from the wireless modem 1431. For example, the IFIC 1433 may receive a signal, which has been down converted to an intermediate frequency band, from the first RFIC 1415 or the second RFIC 1425, and may down convert the received signal to a baseband frequency. As another example, the IFIC 1433 may receive a baseband signal from the wireless modem 1431 and up-convert a frequency band of the received baseband signal to the intermediate frequency band. According to various embodiments, the wireless modem 1431 and the IFIC 1433 may be integrated into one module. For example, the wireless modem 1431 and the IFIC 1433 may be disposed on a main PCB (not shown).

The embodiments above have been described that the electronic device 101 includes only the first antenna module 1410 and the second antenna module 1420, but are not limited thereto. According to various embodiments, the electronic device 101 may further include a third antenna module and a fourth antenna module (see, e.g., dashed boxes in FIG. 14). Referring to FIG. 14, the third antenna module and the fourth antenna module may each correspond to a configuration indicated by a dotted line. In various embodiments, the first antenna module 1410 and the second antenna module 1420 may be disposed on a side surface of the lower end of the electronic device 101, and each of the third antenna module and the fourth antenna module may be disposed on the rear surface of the electronic device 101.

Figure 15:
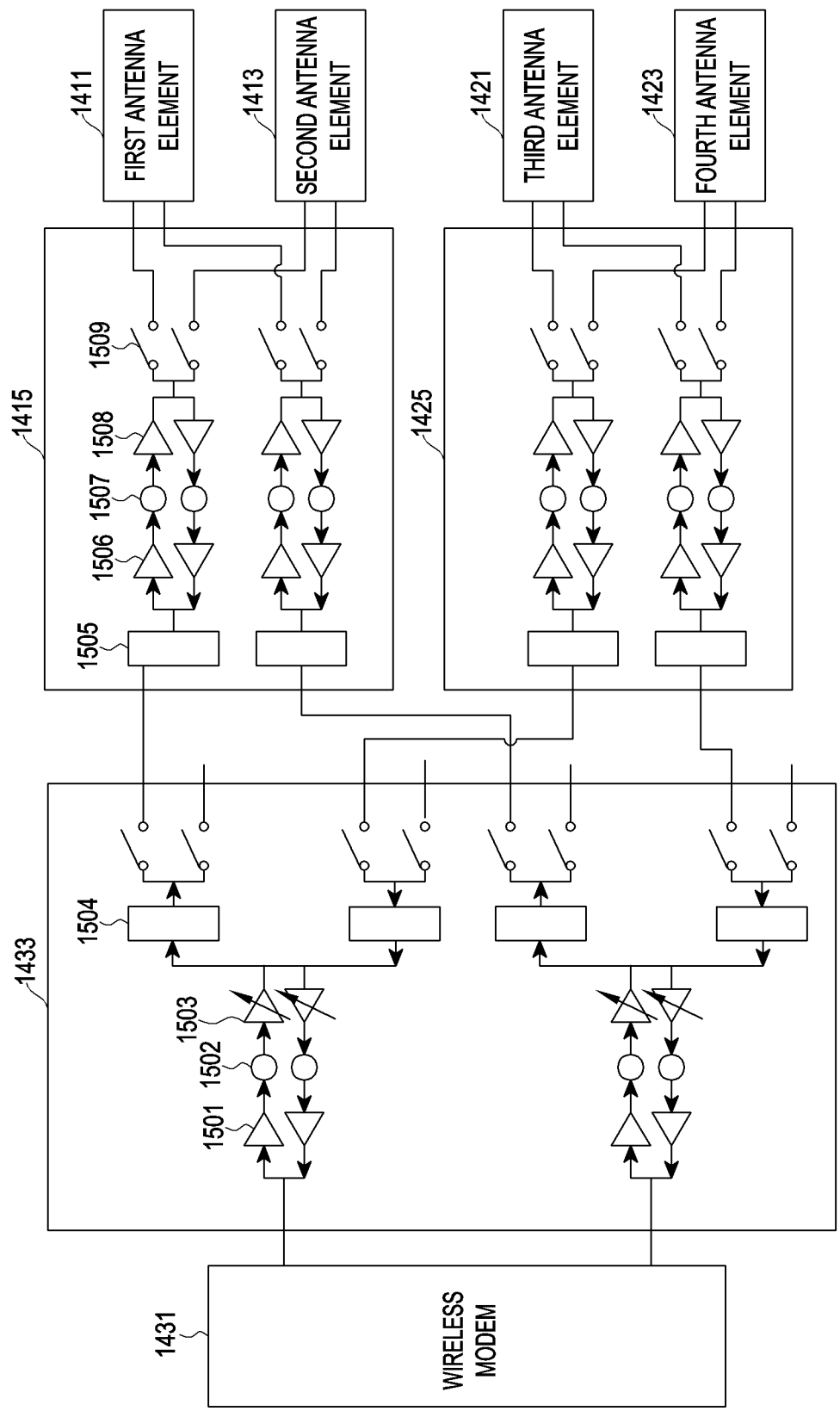
FIG. 15 is a diagram illustrating an example structure of an electronic device supporting multiple antenna modules according to various embodiments.

FIG. 15 is a diagram illustrating an example structure of an electronic device supporting multiple antenna modules according to various embodiments.

According to various embodiments, the wireless modem 1431 may transmit a transmission signal to the IFIC 1433. The transmission signal may correspond to a DAC signal. The DAC signal may correspond to a signal obtained by converting a digital signal, which is received from the processor 120 by the wireless modem 1431, into an analog signal.

According to various embodiments, the IFIC 1433 may receive a DAC signal from the wireless modem 1431 and up-convert a frequency band of the received signal. The IFIC 1433 may include a first variable gain amplifier (VGA) 1501, a frequency up converter 1502, a second VGA 1503, and a multiplexer (MUX) 1504. The first VGA 1501 may receive a control signal from the wireless modem 1431 and adjust a gain of the DAC signal. The DAC signal, which is subject to pass through the first VGA 1501, may be transmitted to the frequency up converter 1502. The frequency up converter 1502 may include a local oscillator and a transmission mixer. The frequency up-converter 1502 may perform frequency conversion through the transmission mixer based on a local signal generated by the local oscillator. The DAC signal may be up converted to an intermediate frequency band from a baseband frequency. The up-converted signal may be transmitted to the second VGA 1503. The second VGA 1503 may adjust the gain of the up-converted signal and transmit the same to the MUX 1504. The MUX 1504 may select one RFIC from among multiple RFICs, and may transmit a signal, having passed through the second VGA 1503, to the selected RFIC.

According to various embodiments, the selected RFIC may correspond to the first RFIC 1415. The signal having passed through the second VGA may be transmitted to the MUX 1505 of the first RFIC 1415. The MUX 1505 may multiplex the transmitted signal with inputs corresponding to the number of antenna elements included in the array antenna. The multiplexed signals may pass through a third VGA 1506, a phase shifter 1507, and a fourth VGA 1508, respectively. The third VGA 1506 and the fourth VGA 1508 may adjust the gain of the multiplexed inputs. The phase shifter may adjust a phase value of each antenna element. For example, in a case of a 1×4 array antenna, the array antenna may include four antenna elements, and the multiplexed inputs may have different phase delay values according to each of the phase shifters. The switch 1509 may perform switching for signal transmission/reception. For example, in a case of a time division multiple access (TDMA) scheme, since transmission and reception of signals cannot be performed simultaneously, switching between a path for a transmission signal and a path for a reception signal may be required.

Although not shown, the first antenna element 1411 to the fourth antenna element 1423 may transmit/receive vertically polarized, horizontally polarized, or double polarized signals. Another DAC signal, which corresponds to a data stream different from that of the DAC signal, may be transmitted from the wireless modem 1431. The other DAC signal may be transmitted to the array antenna through processing according to the above-described embodiments. For example, the DAC signal may correspond to a signal for generation of a vertically polarized signal, and the other DAC signal may correspond to a signal for generation of a horizontally polarized signal.

The electronic device according an example embodiment may include: at least one antenna module comprising at least one antenna, and a processor configured to: control the electronic device receive, through the at least one antenna module, a reference signal (RS) corresponding to each of frequency bands of multiple component carriers (CC) configured for carrier aggregation (CA), identify a reception signal strength of the reference signal corresponding to each of the frequency bands with regard to the multiple CCs, identify at least two CCs operating in the CA among the multiple CCs based on reception signal strengths of multiple RSs corresponding to the multiple CCs, and determine at least one reception beam corresponding to the at least one antenna module based on reception signal strengths of at least two RSs corresponding to the at least two identified CCs.

The electronic device according an example embodiment may include: at least one antenna module comprising at least one antenna, and a processor configured to: control the electronic device to receive, through the at least one antenna module, a reference signal (RS) corresponding to each of frequency bands of multiple component carriers (CC) configured for carrier aggregation (CA), identify a reception signal strength of the RS corresponding to each of the frequency bands of the multiple CCs, group at least two CCs from among the multiple CCs based on the identified reception signal strengths of multiple RSs corresponding to the respective frequency bands of the multiple CCs, and identify a reception beam corresponding to the at least one antenna module based on reception signal strengths of at least two RSs corresponding to the at least two grouped CCs.

According to various example embodiments, the RS may include a synchronization signal block (SSB) signal.

According to various example embodiments, the reception signal strength may include one selected from among reference signal received power (RSRP), received strength signal indicator (RSSI), reference signal received quality (RSRQ), or signal to interference plus noise ratio (SINR).

According to various example embodiments, the processor may be configured to select a reception beam having a largest reception signal strength of a CC, used for data transmission, from among the multiple CCs.

According to various example embodiments, the processor may be configured to select a reception beam having a highest total downlink data rate, based on the identified reception signal strengths of the multiple RSs corresponding to respective frequency bands of the multiple CCs.

According to various example embodiments, the processor may be configured to select a reception beam that maximizes and/or improves the reception signal strength corresponding to a CC, having the smallest reception signal strength of each reception beam, from among the multiple CCs.

According to various example embodiments, the processor may be configured to select a reception beam having a largest average value of reception signal strengths corresponding to the multiple CCs, based on the identified reception signal strengths of the multiple RSs corresponding to respective frequency bands of the multiple CCs.

According to various example embodiments, the processor may be configured to select an optimal reception beam for each CC corresponding to the multiple CCs, and to select a reception beam selected by the largest number of CCs.

According to various example embodiments, the processor may be configured to identify a reception beam based on a reception signal strength of a RS corresponding to at least one activated CC from among the multiple CCs.

According to various example embodiments, the electronic device includes multiple antenna modules, each including at least one antenna, and the processor may be configured to: select a first reception beam for at least one CC from among the multiple CCs, corresponding to a first antenna module from among the multiple antenna modules, and to select a second reception beam for the remaining at least one CC from among the multiple CCs, corresponding to a second antenna module from among the multiple antenna modules.

A method for selecting a reception beam in an electronic device according to an example may include: receiving, through at least one antenna module, a reference signal (RS) corresponding to each of frequency bands of multiple component carriers (CC) configured for carrier aggregation (CA), identifying a reception signal strength of the RS corresponding to each of the frequency bands of the multiple CCs, grouping at least two CCs from among the multiple CCs based on identified reception signal strengths of multiple RSs corresponding to the respective frequency bands of the multiple CCs, and identifying a reception beam corresponding to the at least one antenna module based on reception signal strengths of at least two RSs corresponding to the at least two grouped CCs.

According to various example embodiments, the RS may include a synchronization signal block (SSB) signal.

According to various example embodiments, the reception signal strength may include one selected from among reference signal received power (RSRP), received strength signal indicator (RSSI), reference signal received quality (RSRQ), or signal to interference plus noise ratio (SINR).

According to various example embodiments, in connection with the method, a reception beam having the largest reception signal strength may be selected by a CC, used for data transmission, from among the multiple CCs.

According to various example embodiments, in connection with the method, a reception beam having a highest total downlink data rate may be selected based on the identified reception signal strengths of the multiple RSs corresponding to respective frequency bands of the multiple CCs.

According to various example embodiments, in connection with the method, a reception beam that maximizes and/or improves the reception signal strength with regard to a CC having a smallest reception signal strength of each reception beam, from among the multiple CCs, may be selected.

According to various example embodiments, in connection with the method, a reception beam having a largest average value of reception signal strengths corresponding to the multiple CCs may be selected, based on the identified reception signal strengths of the multiple RSs corresponding to respective frequency bands of the multiple CCs.

According to various example embodiments, in connection with the method, an optimal reception beam for each CC may be selected corresponding to the multiple CCs, and a reception beam, which is selected by the largest number of CCs, may be selected.

According to various example embodiments, in connection with the method, a reception beam may be identified based on a reception signal strength of a reference signal corresponding to at least one activated CC from among the multiple CCs.

According to various example embodiments, in connection with the method, a first reception beam for at least one CC from among the multiple CCs, corresponding to a first antenna module among the multiple antenna modules, may be selected, and a second reception beam for the remaining at least one CC from among the multiple CCs, corresponding to a second antenna module from among the multiple antenna modules, may be selected.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
at least one antenna module including at least one antenna; and
at least one processor configured to:
control the electronic device to receive, through the at least one antenna module, a reference signal (RS) corresponding to each of frequency bands of multiple component carriers (CCs) configured for carrier aggregation (CA),
identify a reception signal strength of the RS corresponding to each of the frequency bands of the multiple CCs,
identify at least two CCs operating in the CA from among the multiple CCs, based on reception signal strengths of multiple RSs corresponding to the multiple CCs, and
identify at least one reception beam corresponding to the at least one antenna module, based on the reception signal strengths of at least two RSs corresponding to the at least two identified CCs.

2. The electronic device of claim 1, wherein each RS comprises a synchronization signal block (SSB) signal.

3. The electronic device of claim 1, wherein the reception signal strength comprises one selected from among reference signal received power (RSRP), received strength signal indicator (RSSI), reference signal received quality (RSRQ), or signal to interference plus noise ratio (SINR).

4. The electronic device of claim 1, wherein the at least one processor is configured to select a reception beam having a largest reception signal strength of a CC used for data transmission, from among the multiple CCs.

5. The electronic device of claim 1, wherein the at least one processor is configured to select a reception beam having a highest total downlink data rate, based on the identified reception signal strengths of multiple RSs corresponding to respective frequency bands of the multiple CCs.

6. The electronic device of claim 1, wherein the at least one processor is configured to select a reception beam which maximizes and/or improves the reception signal strength corresponding to a CC having a smallest reception signal strength of each reception beam, from among the multiple CCs.

7. The electronic device of claim 1, wherein the at least one processor is configured to select a reception beam having a largest average value of reception signal strengths corresponding to the multiple CCs, based on the identified reception signal strengths of multiple RSs corresponding to respective frequency bands of the multiple CCs.

8. The electronic device of claim 1, wherein the at least one processor is configured to select a reception beam for each CC corresponding to the multiple CCs, and to select a reception beam selected by a largest number of CCs.

9. The electronic device of claim 1, wherein the at least one processor is configured to identify a reception beam, based on a reception signal strength of a RS corresponding to at least one activated CC from among the multiple CCs.

10. The electronic device of claim 1, wherein the electronic device comprises multiple antenna modules, and
the at least one processor is configured to:
select a first reception beam for at least one CC from among the multiple CCs, corresponding to a first antenna module from among the multiple antenna modules, and
select a second reception beam for a remaining at least one CC from among the multiple CCs, corresponding to a second antenna module from among the multiple antenna modules.

11. A method for selecting a reception beam in an electronic device, the method comprising:
receiving, through at least one antenna module, a reference signal (RS) corresponding to each of frequency bands of multiple component carriers (CCs) configured for carrier aggregation (CA);
identifying a reception signal strength of the RS corresponding to each of frequency bands of the multiple CCs;
identifying at least two CCs operating in the CA from among the multiple CCs, based on reception signal strengths of multiple RSs corresponding to the multiple CCs; and
identifying at least one reception beam corresponding to the at least one antenna module, based on reception signal strengths of at least two RSs corresponding to the at least two identified CCs.

12. The method of claim 11, wherein each RS comprises a synchronization signal block (SSB) signal.

13. The method of claim 11, wherein the reception signal strength comprises one selected from among reference signal received power (RSRP), received strength signal indicator (RSSI), reference signal received quality (RSRQ), or signal to interference plus noise ratio (SINR).

14. The method of claim 11, wherein a reception beam having a largest reception signal strength is selected by a CC used for data transmission, from among the multiple CCs.

15. The method of claim 11, wherein a reception beam having a highest total downlink data rate is selected at least based on the identified reception signal strengths of the multiple RSs corresponding to respective frequency bands of the multiple CCs.

16. A non-transitory machine-readable storage medium storing instructions which, when executed by at least one processor of an electronic device, cause the electronic device to perform operations comprising:
receiving, through at least one antenna module, a reference signal (RS) corresponding to each of frequency bands of multiple component carriers (CCs) configured for carrier aggregation (CA);
identifying a reception signal strength of the RS corresponding to each of frequency bands of the multiple CCs;
identifying at least two CCs operating in the CA from among the multiple CCs, based on reception signal strengths of multiple RSs corresponding to the multiple CCs; and
identifying at least one reception beam corresponding to the at least one antenna module, based on reception signal strengths of at least two RSs corresponding to the at least two identified CCs.

17. The non-transitory machine-readable storage medium of claim 16, wherein each RS comprises a synchronization signal block (SSB) signal.

18. The non-transitory machine-readable storage medium of claim 16, wherein the reception signal strength comprises one selected from among reference signal received power (RSRP), received strength signal indicator (RSSI), reference signal received quality (RSRQ), or signal to interference plus noise ratio (SINR).

19. The non-transitory machine-readable storage medium of claim 16, wherein a reception beam having a largest reception signal strength is selected by a CC used for data transmission, from among the multiple CCs.

20. The non-transitory machine-readable storage medium of claim 16, wherein a reception beam having a highest total downlink data rate is selected at least based on the identified reception signal strengths of the multiple RSs corresponding to respective frequency bands of the multiple CCs.

* * * * *